106-18.32 SR

XR 3,662,069

United 3,662,069

Patented May 9, 1972

[redacted]

3,662,069

ALKYL 1-(N-SUBSTITUTED THIOCARBAMOYL)-2-BENZIMIDAZOLECARBAMATES AS FUNGICIDES AND MITE OVICIDES

Bruce I. Dittmar, Wilmington, Del., assignor to E. I. du Pont de Nemours and Company, Wilmington, Del.

No Drawing. Filed May 16, 1969, Ser. No. 825,405
Int. Cl. A01n 9/22
U.S. Cl. 424—273 8 Claims

ABSTRACT OF THE DISCLOSURE

The novel compounds of the following structure are useful as fungicides and mite ovicides:

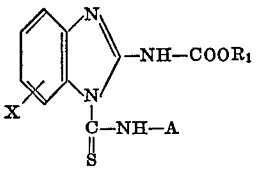

wherein $R_1$ is methyl, ethyl, isopropyl or sec-butyl;
X is hydrogen, halogen, methyl, methoxy or nitro; and
A is various acyl, alkoxycarbonyl or alkyl sulfonyl groups.

These compounds are made by the reaction of an alkyl 2-benzimidazolecarbamate with a N-substituted isothiocyanate.

An exemplary specie of this class is 1-[(methoxycarbonyl)-thiocarbamoyl]-2-benzimidazolecarbamate.

BACKGROUND OF THE INVENTION

Various benzimidazolecarbamates have been found to have outstanding fungicidal activity. Examples of such compounds can be found in U.S. Pats. 2,933,502 and 2,933,504 and Belgian Pat. 698,071.

This invention relates to a novel group of alkyl 1-(N-substituted thiocarbamoyl) - 2 benzimidazolecarbamates and to methods of using these compounds to prevent or mitigate damage to plants and inanimate organic material by fungi and mites. Fungus mycelia are killed or prevented from developing further by the presence of one or more of the compounds, i.e., the compounds are fungicidal or fungistatic.

SUMMARY OF THE INVENTION

It has been found that outstanding fungicidal and mite ovicidal activity can be obtained by applying to the locus of infection and/or infestation the compounds represented by the following formula:

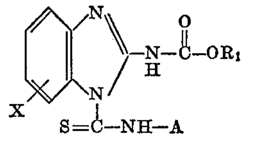

wherein $R_1$ is methyl, ethyl, isopropyl or sec-butyl;
X is hydrogen, halogen, methyl, methoxy or nitro;
A is $$-\overset{O}{\overset{\|}{C}}-YR_2,\quad -\overset{O}{\overset{\|}{C}}-R_3 \text{ or } -\overset{O}{\overset{\uparrow}{\underset{\downarrow}{\underset{O}{S}}}}-R_4$$

$R_2$ is alkyl of 1 through 12 carbon atoms, cyclohexyl, phenyl, benzyl, allyl or propargyl;
$R_3$ is alkyl of 1 through 12 carbon atoms, cyclohexyl, phenyl, or benzyl;
$R_4$ is alkyl of 1 through 12 carbon atoms, alkyl of 1 through 12 carbon atoms substituted with 1 through 5 chlorine atoms, or

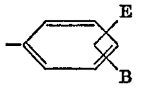

where

B is methyl, methoxy, bromine, chlorine, nitro or hydrogen and E is hydrogen or chlorine, provided that E is hydrogen when B is neither hydrogen nor chlorine;

Y is oxygen or sulfur.

Preferred among the compounds of Formula I because of their high degree of activity are the compounds where X is hydrogen, $R_1$ is methyl or ethyl and A contains 1 through 7 carbon atoms.

Most preferred are those compounds where X is hydrogen, $R_1$ is methyl and A is $$-\overset{O}{\overset{\|}{C}}-Y-R_2$$

DETAILED DESCRIPTION OF THE INVENTION

The compounds of this invention, which are represented by Formula I above, can be prepared by the reaction of alkyl 2-benzimidazolecarbamates (II) and N-substituted isothiocyanates (III), as shown below:

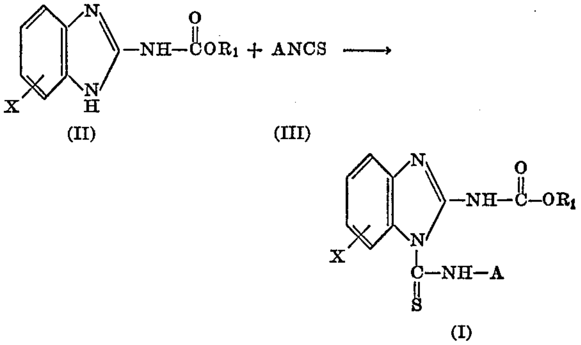

wherein:

$R_1$ is methyl, ethyl, isopropyl or sec-butyl;
X is hydrogen, halogen, methyl, methoxy or nitro;
A is $$-\underset{O}{\underset{\|}{C}}-Y-R_2,\quad -\underset{O}{\underset{\|}{C}}-R_3 \text{ or } -\overset{O}{\overset{\uparrow}{\underset{\downarrow}{\underset{O}{S}}}}-R_4$$

$R_2$ is alkyl of 1 through 12 carbon atoms, cyclohexyl, phenyl, benzyl, allyl or propargyl;
Y is oxygen or sulfur;
$R_3$ is alkyl of 1 through 12 carbon atoms, cyclohexyl, phenyl or benzyl;
$R_4$ is alkyl of 1 through 12 carbon atoms, alkyl of 1 through 12 carbon atoms substituted with 1 through 5 chlorine atoms or

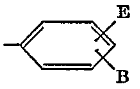

3662069
OR IN 424/273 wherein

B is methyl, methoxy, bromine, chlorine, nitro or hydrogen and E is hydrogen or chlorine, with the proviso that E is limited to hydrogen when B is neither hydrogen nor chlorine.

The reaction shown above is conducted preferentially in the presence of a tertiary amine base, e.g., triethylenediamine, which serves as a catalyst for the reaction.

The starting isothiocyanates (III) can be prepared from the appropriate acid halide and potassium thiocyanate, e.g., methoxycarbonyl isothiocyanate can be prepared from methyl chloroformate and potassium thiocyanate.

The starting alkyl 2-benzimidazolecarbamates (II) can be prepared by methods known to the art, e.g. by a three reaction sequence taught in U.S. Pat. 3,010,968.

The following examples serve to illustrate the general method of preparation of the compounds of this invention. All parts are by weight unless otherwise indicated.

EXAMPLE 1

Preparation of methyl 1-[(methoxycarbonyl)thiocarbamoyl]-2-benzimidazolecarbamate To a stirred mixture of methyl 2-benzimidazolecarbamate (9.6 parts) and triethylenediamine (0.1 part) in acetone (100 parts) is added methoxycarbonyl isothiocyanate (6.5 parts) at room temperature. The reaction mixture is stirred at room temperature overnight, filtered, and the solvent evaporated under reduced pressure. The residue from the filtrate is triturated with ether and methyl 1-[(methoxycarbonyl)thiocarbamoyl] - 2 - benzimidazolecarbamate collected by filtration. It exhibits a melting point of 111–112° C. (with decomposition).

The compounds in the following table can be prepared by following the procedure outlined in Example 1 and substituting for methyl 2-benzimidazolecarbamate and methoxycarbonyl isothiocyanate equivalent amounts of the indicated alkyl 2-benzimidazolecarbamate and isothiocyanate.

TABLE

| Alkyl 1-(N-substituted thiocarbamoyl)-2-benzimidazolecarbamates | Alkyl 2-benzimidazolecarbamate | Isothiocyanates |
|---|---|---|
| Methyl 1-[(cyclohexyloxycarbonyl)-thiocarbamoyl]-2-benzimidazolecarbamate. | Methyl 2-benzimidazolecarbamate | Cyclohexyloxycarbonyl isothiocyanate. |
| Methyl 1-[(phenoxycarbonyl)thiocarbamoyl]-2-benzimidazolecarbamate. | do | Phenoxycarbonyl isothiocyanate. |
| Methyl 1-[(allyloxycarbonyl)thiocarbamoyl]-2-benzimidazolecarbamate. | do | Allyloxycarbonyl isothiocyanate. |
| Methyl 1-[(ethoxycarbonyl)thiocarbamoyl]-2-benzimidazolecarbamate. | do | Ethoxycarbonyl isothiocyanate. |
| Methyl 1-[(benzyloxycarbonyl)thiocarbamoyl]-2-benzimidazolecarbamate. | do | Benzyloxycarbonyl isothiocyanate. |
| Methyl 1-[(hexyloxycarbonyl)thiocarbamoyl]-2-benzimidazolecarbamate. | do | Hexyloxycarbonyl isothiocyanate. |
| Methyl 1-[(dodecyloxycarbonyl)thiocarbamoyl]-2-benzimidazolecarbamate. | do | Dodecyloxycarbonyl isothiocyanate. |
| Methyl 1-[(methylthiolcarbonyl)thiocarbamoyl]-2-benzimidazolecarbamate. | do | Methylthiolcarbonyl isothiocyanate. |
| Methyl 1-[(hexylthiolcarbonyl)thiocarbamoyl]-2-benzimidazolecarbamate. | do | Hexylthiolcarbonyl isothiocyanate. |
| Methyl 1-[(acetyl)thiocarbamoyl]-2-benzimidazolecarbamate. | do | Acetyl isothiocyanate. |
| Methyl 1-[(octanoyl)thiocarbamoyl]-2-benzimidazolecarbamate. | do | Octanoyl isothiocyanate. |
| Methyl 1-[(dodecanoyl)thiocarbamoyl]-2-benzimidazolecarbamate. | do | Dodecanoyl isothiocyanate. |
| Methyl 1-[(benzoyl)thiocarbamoyl]-2-benzimidazolecarbamate. | do | Benzoyl isothiocyanate. |
| Methyl 1-[(phenylacetyl)thiocarbamoyl]-2-benzimidazolecarbamate. | do | Phenylacetyl isothiocyanate. |
| Methyl 1-[(cyclohexylcarbonyl)thiocarbamoyl]-2-benzimidazolecarbamate. | do | Cyclohexylcarbonyl isothiocyanate. |
| Methyl 1-[(methylsulfonyl)thiocarbamoyl]-2-benzimidazolecarbamate. | do | Methylsulfonyl isothiocyanate. |
| Methyl 1-[(3-chloropropylsulfonyl)-thiocarbamoyl]-2-benzimidazolecarbamate. | do | 3-chloropropylsulfonyl isothiocyanate. |
| Methyl 1-[(trichloromethylsulfonyl)-thiocarbamoyl]-2-benzimidazolecarbamate. | do | Trichloromethylsulfonyl isothiocyanate. |
| Methyl 1-[(dodecylsulfonyl)thiocarbamoyl]-2-benzimidazolecarbamate. | do | Dodecylsulfonyl isothiocyanate. |
| Methyl 1-[(phenylsulfonyl)thiocarbamoyl]-2-benzimidazolecarbamate. | do | Phenylsulfonyl isothiocyanate. |
| Methyl 1-[(p-chlorophenylsulfonyl)thiocarbamoyl]-2-benzimidazolecarbamate. | do | p-Chlorophenylsulfonyl isothiocyanate. |
| Methyl 1-[p-tolylsulfonyl)thiocarbamoyl]-2-benzimidazolecarbamate. | do | p-Tolylsulfonyl isothiocyanate. |
| Methyl 1-[(m-nitrophenylsulfonyl)thiocarbamoyl]-2-benzimidazolecarbamate. | do | m-Nitrophenylsulfonyl isothiocyanate. |
| Methyl 1-[(p-methoxyphenylsulfonyl)thiocarbamoyl]-2-benzimidazolecarbamate. | do | p-Methoxyphenylsulfonyl isothiocyanate. |
| Methyl 1-[(p-bromophenylsulfonyl)thiocarbamoyl]-2-benzimidazolecarbamate. | do | p-Bromophenylsulfonyl isothiocyanate. |
| Methyl 1-[(2,5-dichlorophenylsulfonyl)-thiocarbamoyl]-2-benzimidazolecarbamate. | do | 2,5-dichlorophenylsulfonyl isothiocyanate. |
| Ethyl 1-[(methoxycarbonyl)thiocarbamoyl]-2-benzimidazolecarbamate. | Ethyl 2-benzimidazolecarbamate | Methoxycarbonyl isothiocyanate. |
| Ethyl 1-[(butoxycarbonyl)thiocarbamoyl]-2-benzimidazolecarbamate. | do | Butoxycarbonyl isothiocyanate. |
| Ethyl 1-[(decyloxycarbonyl)thiocarbamoyl]-2-benzimidazolecarbamate. | do | Decyloxycarbonyl isothiocyanate. |
| Ethyl 1-[(ethylthiolcarbonyl)thiocarbamoyl]-2-benzimidazolecarbamate. | do | Ethylthiolcarbonyl isothiocyanate. |
| Ethyl 1-[(phenylthiolcarbonyl)thiocarbamoyl]-2-benzimidazolecarbamate. | do | Phenylthiolcarbonyl isothiocyanate. |
| Ethyl 1-[(decylthiolcarbonyl)thiocarbamoyl]-2-benzimidazolecarbamate. | do | Decylthiolcarbonyl isothiocyanate. |
| Ethyl 1-[(propionyl)thiocarbamoyl]-2-benzimidazolecarbamate. | do | Propionyl isothiocyanate. |
| Ethyl 1-[(undecanoyl)thiocarbamoyl]-2-benzimidazolecarbamate. | do | Undecanoyl isothiocyanate. |
| Ethyl 1-[(ethylsulfonyl)thiocarbamoyl]-2-benzimidazolecarbamate. | do | Ethylsulfonyl isothiocyanate. |
| Ethyl 1-[(hexylsulfonly)thiocarbamoyl]-2-benzimidazolecarbamate. | do | Hexylsulfonyl isothiocyanate. |
| Ethyl 1-[(p-nitrophenylsulfonyl)thiocarbamoyl]-2-benzimidazolecarbamate. | do | p-Nitrophenylsulfonyl isothiocyanate. |

| Alkyl 1-(N-substituted thiocarbamoyl)-2-benzimidazolecarbamates | Alkyl 2-benzimidazolecarbamate | Isothiocyanates |
|---|---|---|
| Isopropyl 1-[(methoxycarbonyl)thiocarbamoyl]-2-benzimidazolecarbamate. | Isopropyl 2-benzimidazolecarbamate | Methyoxycarbonyl isothiocyanate. |
| Isopropyl 1-[(undecyloxycarbonyl)thiocarbamoyl]-2-benzimidazolecarbamate. | do | Undecyloxycarbonyl isothiocyanate. |
| Isopropyl 1-[(octyloxycarbonyl)thiocarbamoly]-2-benzimidazolecarbamate. | do | Octyloxycarbonyl isothiocyanate. |
| Isopropyl 1-[(phenoxycarbonyl)thiocarbamoyl]-2-benzimidazolecarbamate. | do | Phenoxycarbonyl isothiocyanate. |
| Isopropyl 1-[(butylthiocarbonyl)thiocarbamoyl]-2-benzimidazolecarbamate. | do | Butylthiocarbonyl isothiocyanate. |
| Isopropyl 1-[(dodecylthiolcarbonyl)-thiocarbamoyl]-2-benzimidazolecarbamate. | do | Dodecylthiolcarbonyl isothiocyanate; |
| Isopropyl 1-[(cyclohexylthiolcarbonyl)-thiocarbamoyl]-2-benzimidazolecarbamate. | do | Cyclohexylthiolcarbonyl isothiocyanate; |
| Isopropyl 1-[(pentanoyl)thiocarbamoyl]-2-benzimidazolecarbamate. | do | Pentanoyl isothiocyanate. |
| Isopropyl 1-[(heptanoyl)thiocarbamoyl]-2-benzimidazolecarbamate. | do | Heptanoyl isothiocyanate. |
| Isopropyl 1-[(propylsulfonyl)thiocarbamoyl]-2-benzimidazolecarbamate. | do | Propylsulfonyl isothiocyanate. |
| Isopropyl 1-[(octylsulfonyl)thiocarbamoyl]-2-benzimidazolecarbamate. | do | Octylsulfonyl isothiocyanate. |
| Isopropyl 1-[(o-nitrophenylsulfonyl)thiocarbamoyl]-2-benzimidazolecarbamate. | do | o-Nitrophenylsulfonyl isothiocyanante; |
| Sec-butyl 1-[(pentoxycarbonyl)thiocarbamoyl]-2-benzimidazolecarbamate. | Sec-butyl 2-benzimidazolecarbamate | Pentoxycarbonyl isothiocyanate. |
| Sec-butyl 1-[(octyloxycarbonyl)thiocarbamoyl]-2-benzimidazolecarbamate. | do | Octyloxycarbonyl isothiocyanate. |
| Sec-butyl 1-[(propargyloxycarbonyl)thiocarbamoyl]-2-benzimidazolecarbamate. | do | Propargyloxycarbonyl isothiocynaate. |
| Sec-butyl 1-[(hexylthiolcarbonyl)thiocarbamoyl]-2-benzimidazolecarbamate. | do | Hexylthiolcarbonyl isothiocyanate. |
| Sec-butyl 1-[(octylthiolcarbonyl)thiocarbamoyl]-2-benzimidazolecarbamate. | do | Octylthiolcarbonyl isothiocyanate. |
| Sec-butyl 1-[(hexanoyl)thiocarbamoyl]-2-benzimidazolecarbamate. | do | Hexanoyl isothiocyanate. |
| Sec.butyl 1-[(decanoyl)thiocarbamoyl]-2-benzimidazolecarbamate. | do | Decanoyl isothiocyanate. |
| Sec-butyl 1-[(benzoyl)thiocarbamoyl]-2-benzimidazolecarbamate. | do | Benzoyl isothiocyanate. |
| Sec-butyl 1-[(butylsulfonyl)thiocarbamoyl]-2-benzimidazolecarbamate. | do | Butylsulfonyl isothiocyanate. |
| Sec-butyl 1-[(decylsulfonyl)thiocarbamoyl]-2-benzimidazolecarbamate. | do | Decylsulfonyl isothiocyanate. |
| Sec-butyl 1-[(benzenesulfonyl)thiocarbamoyl]-2-benzimidazolecarbamate. | do | Benzenesulfonyl isothiocyanate. |
| Methyl 1-[(methoxycarbonyl)thiocarbamoyl]-4-chloro-2-benzimidazolecarbamate. | Methyl 4-chloro-2-benzimidazolecarbamate. | Methyoxycarbonyl isothiocyanate. |
| Methyl 1-[(ethoxycarbonyl)thiocarbamoyl]-5-fluoro-2-benzimidazolecarbamate. | Methyl 5-fluoro-2-benzimidazolecarbamate. | Ethoxycarbonyl isothiocyananate. |
| Methyl 1-[(acetyl)thiocarbamoyl]-7-bromo-2-benzimidazolecarbamate. | Methyl 7-bromo-2-benzimidazolecarbamate. | Acetylcarbonyl isothiocyanate. |
| Methyl 1-[(phenylacetyl)thiocarbamoyl]-6-iodo-2-benzimidazolecarbamate. | Methyl 6-iodo-2-benzimidazolecarbamate. | Phenylacetyl isothiocyanate. |
| Methyl 1-[(benzoyl)thiocarbamoyl]-4-methyl-2-benzimidazolecarbamate. | Methyl 4-methyl-2-benzimidazolecarbamate. | Benzoyl isothiocyanate. |
| Methyl 1-[(ethoxycarbonyl)thiocarbamoyl]-5-methoxy-2-benzimidazolecarbamate. | Methyl 5-methoxy-2-benzimidazolecarbamate. | Ethoxycarbonyl isothiocyanate. |
| Methyl 1-[(methoxycarbonyl)thiocarbamoyl]-6-methyl-2-benzimidazolecarbamate. | Methyl 6-methyl-2-benzimidazolecarbamate. | Methoxycarbonyl isothiocyanate. |
| Methyl 1-[(butanoyl)thiocarbamoyl]-4-nitro-2-benzimidazolecarbamate. | Methyl 4-nitro-2-benzimidazolecarbamate. | Butanoyl isothiocyanate. |
| Methyl 1-[(2,2,3,3,3-pentachloropropylsulfonly)thiocarbamoyl]-5-nitro-2-benzimidazolecarbamate. | Methyl 5-nitro-2-benzimidazolecarbamate. | 2,2,3,3,3-pentachloropropylsulfonyl isothiocyanate. |

As mentioned previously, it has been found that the compounds of Formula I possess outstanding fungicidal and mite ovicidal activity when employed to prevent or mitigate damage to plants and inanimate organic materials. A further aspect of this invention involves methods which when used in conjunction with the compounds of Formula I, result in advances in mite and fungus control of great practical importance. The paragraphs which follow describe in more detail the utility of this invention.

The compounds of the invention control a wide variety of fungus diseases of foliage, fruit, stems and roots of growing plants without damage to the host. Fruits, tubers, bulbs, roots, seeds and other plant parts harvested for food, animal feed or for other purposes are protected from fungus deterioration during processing, distribution and storage. Seeds, tubers, cuttings and other plants propagation materials are protected from fungus attack during handling and storage, as well as in the soil after planting. Wood, fabric, fiber board, paper and other industrial materials are protected from unsightly stain and destructive decay caused by fungi. Luggage, shoes, shower curtains, carpets, mats, clothing and other useful household, public or industrial items are protected from rot, fungus stains and mold growth. Painted surfaces are protected from stain and discoloration by incorporation of a compound of this invention in the paint formulation.

The many fungi against which the compounds of this invention are active may be represented by, but is not intended to be limited to, the following: *Venturia inaequalis*, which causes apple scab; *Podosphaera leucotricha*, which causes powdery mildew on apple; *Uromyces phaseoli*, which causes bean rust; *Cercospora apii*, which causes early blight of celery; *Cercospora beticola*, which causes leaf spot of sugar beets; *Sclerotinia sclerotiorum*, which causes rot of vegetable crops, such as lettuce, beans, carrots, and celery; Colletotrichum spp., which cause anthracnose of fruits and vegetables, such as beans, tomatoes and coffee; *Septoria apii*, which causes late blight of celery; *Cercospora musae*, which causes Sigotoka disease of banana; Piricularia sp., which causes Johnson spot on banana; *Erysiphe cichoracearum*, which causes powdery mildew on cantalous and other cucurbit crops; *Penicillium digitatum*, Phomopsis, spp., and *Diplodia natalensis*, which cause fruit rots on citrius; *Ceratostomella ulmi*, which causes Dutch elem disease; *Sphaerotheca humuli*, which causes powdery mildew on roses; *Diplocarpon rosae*, which causes black spot on roses; Ramularia sp., which causes leaf spots on ornamental plants; *Botrytis cinerea*, which causes blossom and fruit rots of ornaments, fruits and vegetables; *Uncinula nector*, which causes powdery mildew on grapes; *Guignardia bidwellii*, which causes grape black rot; *Melonconium fuligineum*, which causes white rot of grapes; *Coccomyces hiemalis,* which causes cherry leaf spot; *Cytospora,* sp., which cause cankers of trees; *Cladosporium carpophilum,* which causes peach scab; *Fusicladium effusum,* which causes pecan scab; *Erysiphe graminis,* which causes powdery mildew on cereals; *Monolina,* (*Sclerotinia*) *laxa* and *M. fructicola,* which cause brown rot of stone fruits, such as peaches, cherries and apricots; *Pseudopeziza ribes,* which causes leaf spot on gooseberry; *Piriculari oryzae,* which causes rice blast; *Puccina glumarum* and *P. coronata* which cause leaf rusts of wheat, oats and grasses, respectively; *Puccinia gramiinis tritici,* which causes stem rust of wheat; *Claviceps purpurea,* which causes ergot of rye and grasses; *Aspergillus niger,* which causes cotton boll rot as well as decay following wounding in many plant tissues; *Aspergillus flavus,* which causes mold growth on peanuts, as well as on other food and field materials; *Aspergillus terreus,* which is common in soil and attacks vegetable matter; *Tilletia caries* and other *Tilletia* species, which cause common bunt of wheat; *Ustilago tritici, Ustilago nigra, Ustilago avena* (and other Ustilago species), which cause loose smut of wheat, barley, and oats, respectively; *Urocystis tritici* and other Urocystis species, which cause loose smut of wheat; *Sphacelotheca sorghi,* which causes covered smut of sorghum; *Ustilago hordei* and *Ultilago kolleri,* which cause covered smut of barley and oats, respectively; *Pithomyces chartorum,* which is present in turf, pastures, and other grassey area and is known to have several secondary effects; *Gloeodes pomigena,* which causes sooty blotch on apples; *Physalospora obtusa,* which causes black rot on apples; *Microthyriella rubi,* which causes flyspeck on apples; various species of Rhizotonia, Fusarium and Verticillium present in soil and attaching the roots or other underground parts and the vascular system of a variety of plants; various species of Pencillium growing on such things as fabric, fiber board, leather goods and paint; species of Myrothecium attacking such items as shower curtains, carposes, mats and clothing.

The mite ovicidal action of the compounds of this invention is useful in preventing the development of damaging populations of mites or in causing the gradual reduction of existing populations. The movement of mites is limited. Thus, an increase in population or the continuation of a high populattion in a particular locus depends largely upon the hatching of eggs laid in that locus.

Mite eggs do not hatch to produce living young if these eggs are treated with one of these compounds, or if they are laid on a surface containing one of these compounds. Further, the eggs will not hatch if they are laid by a female mite that has been in contact with one of these compounds, or are laid by a female mite that is ingesting or has recently ingested food such as plant juices containing one of these compounds. This interference with the hatching of eggs prevents the population from increasing significantly beyond that present at the time of treatment. Also, this ovicidal action, along with the high natural mortality of adults, can largely eliminate mites from an already infested area over a relatively short period of time. Further as long as the compounds are present on the surface the mites occupy or remain in their food supply, new populations cannot develop.

Many species of mites which cause damage to fruits, field crops, vegetables, and ornamentals under a wide variety of circumstances, are controlled by the compounds and methods of this invention. The extent of the practical utility of the mite control obtained is represented by, but is not intended to be limited to, the following listing of specific susceptible mites along with the types of damage that they can cause: *Panonychus ulmi* (European red mite) and *Tetranychus telarius* (two-spotted mite) which are commonly called "orchard mites"; these mites attack a great many deciduous tree fruits including apples, pears, cherries, plums and peaches; *Tetranychus atlanticus* (Atlantic or strawberry mite), *T. cinnabrainus* (carmine spider mite) and *T. pacificus* (Pacific mite); these mites attack cotton and numerous other crop plants; *Paratetranychus citri* (citrus red mite) and others which attack citrus; *Phyllocuptruta sleivora* which causes citrus rust; *Bryobia praetiosa* (clover mite) which attacks clover, alfalfa and other crops; *Phyllosoptruta oleivora,* the citrus rust mite; *Aceria neocynodomis* which attacks grasses and other plants; *Tyrophagus lintneri* which is a serious pest in stored foods and on cultivated mushrooms and *Lepidoglyphus destructor* which injures Kentucky bluegrass seed in storage.

The compounds of this invention when applied by certain of the methods of this invention enter and move freely within plants, i.e., they are systemic. Thus both fungi and mites can be controlled in plants in parts well removed from the point of application. In view of this activity the compounds can be applied to seeds; thus the treatment of cucumber seeds with a few grams per 50 kilograms of seed of a compound of this invention provides control of powdery mildew (*Erysiphe cichoracearum*) and spider mites such as *Tetranychus urticae* on the resulting plants for periods in excess of 40 days. Applications to soil also provides control of certain foliage diseases and mites on plants growing in the treated soil. Spray or dust treatments of plant foliage and stems impart protection against both fungi and mites to other parts of the plant not actually sprayed and to new foliage developing later.

There are important practical advantages associated with the use of an effective systemic pesticide. Thus successful application to seed as described above, results in great savings in chemical and application costs. Soil applications which effectively protect entire plants for an extended period also represent similar savings. Distribution within the plant following foliage treatment eliminates the need for frequent retreatment to protect rapidly growing tissue. Also, materials within the plant are not subject to removal by rainfall. Similarly, movement or translocation of the chemical within the plant can provide protection to those parts of the plant that may not have been covered by the orginal spray application. This is of particular importance with plants of dense growth character resisting the intrusion of the spray and also to tall plants, such as shade trees, where the spray will not reach to the top.

An additional valuable characteristic of the compounds of this invention is their ability to prevent the spread or to kill fungus infection already established within a plant, i.e. they are curative. Thus, the compounds need not be applied until after conditions develop which permit the actual initiation of fungus attack. This means that, under some circumstances, it is possible to avoid applying any chemical during the entire life of the crop. In other cases, only a part of the normal full schedule of pesticide is required.

Therefore great savings both in chemical cost and application labor are possible with compounds capable of systemic and curative performance. Another saving is afforded by the compounds of this invention through the fact that both fungi and mites are controlled by applications of a single chemical.

The compounds of this invention provide protection from damage caused by fungi, mites or both when applied to the proper locus by the methods described hereinafter and at sufficient rate to exert the desired fungicidal and mite ovicidal effect. They are especially suited for the protection of living plants such as fruit-bearing trees, nut-bearing trees, ornamental trees, forest trees, vegetable crops, horticultural crops (including ornamentals, small fruits and berries), fiber crops, grain and seed crops, sugarcane, sugar beets, pineapple, forage and hay crops, beans, peas, soybeans, peanuts, potatoes, sweet potatoes, tobacco, hops, turf and pasture.

Living plants may be protected from fungi and mites by applying one or more of the compounds of this invention to the soil in which they are growing or in which they may subsequently be seeded or planted; or to seeds, tubers, bulbs or other plant reproductive parts prior to planting; as well as to foliage, stems and fruit of the living plant. Living plants can also be protected by dipping the root system or physically injecting the chemical or chemicals into roots or stems.

Soil applications are made from dusts, granules, pellets, slurries or solution. Preferred rates for application of the compounds of this invention to soil in which plants are or will be growing range from 0.01 to 500 parts per million by weight of the soil in which the roots are or will be growing. More preferred use rates are in the range of 0.1 to 50 parts per million, and the most preferred rates are in the range of 0.25 to 25 parts per million.

Preferred rates for application to seeds, tubers, bulbs, or other plant reproductive parts, range from 0.03 to 6000 grams of active compound of this invention per 50 kilograms of planting material treated. More preferred rates are in the range of 0.3 to 3000 grams of active compound per 50 kilograms. The most preferred rates are in the range of 2.8 to 1500 grams per 50 kilograms. Applications are made from dusts, slurries or solution. Such treatments protect the treated parts themselves from damage due to fungi, mites, or both and, in addition, impart extended protection against both types of pests to the resulting new plants.

Preferred rates for application of the compounds of this invention to foliage, stems and fruit of living plants range from 0.012 to 60 kilograms of active ingredient per hectare. More preferred rates are in the range of 0.025 to 30 kilograms per hectare and the most preferred rates are in the range of 0.05 to 15 kilograms per hectare. The optimum amount within this range depends upon a number of variables which are well known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days. Applications are made from dusts, slurries or solutions.

Preferred rates for dip applications to roots of living plants are in the range of 0.5 to 18,000 grams of active ingredient per 380 liters of water or other liquid carrier. More preferred rates are in the range of 4.5 to 9,000 grams per 380 liters and the most preferred rates are in the range of 45 to 4500 grams per 380 liters.

Preferred rates for injection into the roots or stems of living plants are in the range of 0.01 to 10,000 parts per million of water or other liquid carrier. More preferred rates are in the range of 0.1 to 5,000 parts per million. The most preferred rates are in the range of 1 to 1,000 parts per million.

Plant parts such as fruits, tubers, bulbs, foilage roots and the like, harvested for food or feed, are protected from decay and other deterioration caused by fungi or mites during processing, distribution and storage by treatment with an active compound of this invention. The plant parts to be so protected can be dipped in a liquid bath containing the active ingredient, dusted with a finely divided preparation of the active ingredient, sprayed, misted with an aerosol containing the compound, or enclosed in wrapping or packing materials impregnated with the active compound.

If a liquid bath is used, it can contain an amount of the active ingredient in the range of 1 to 5,000 parts per million of the weight of the fluid. A more preferred range for the bath is 5 to 2,500 parts per million, and the most preferred range is 10 to 1,000 parts per million.

Dusts as well as wrapping or packing materials used for this type of application can contain 0.01 to 10% of the active ingredient. More preferred rates are in the range of 0.1 to 5% and the most preferred rates are in the range of 0.2 to 2.5%.

Wood, leather, fabric, fiber board, paper and other industrial materials of an organic nature can be protected from decomposition or discoloration by fungi and infestation by mites by coating, incorporating or impregnating with an effective amount of one or more of the compounds of this invention. The coating can be accomplished by dipping, spraying, flooding, misting (as with an aerosol) or dusting the material to be protected with a suitable composition containing the active ingredient. The preferred use rates for the active ingredient in the treating preparation actually applied to the material to be protected are in the range of 0.025 to 95% by weight. More preferred rates are in the range of 0.05 to 50%, with the most preferred rates being in the range of 0.1 to 25%.

Where incorporation or impregnation procedures are to be employed, use rates may be expressed in terms of the amount of active ingredient introduced into the material to be protected. The preferred use rates for these types of applications are in the range of 0.001 to 30 percent by weight of active ingredient in the final product. More preferred rates are in the range of 0.005 to 15% with the most preferred rates being in the range of 0.01 to 7%.

Luggage, shoes, shower curtains, carpets, mats, clothing and other useful household, public or industrial items are protected from rot, fungus stains and unsightly mold growth as well as infestation by mites by the active compounds of this invention. Again, either surface or deep protection can be obtained. Surface treatment is by dips, washes, sprays, aerosols or dust applications. Deep treatment is accomplished by penetrating solutions. Sprays, dips and washes contain the active compound of the invention at rates of 10 to 5000 parts per million. Fluids for aerosol application and dusts contain 0.1 to 20% by weight. Penetrating solvent solutions contain an amount of the active ingredient that results in a deposit of 5 to 20,000 parts per million in the material to be protected.

Painted surfaces can be protected from unsightly stain and mold growth by incorporating in the paint formulation, prior to application, 5 to 20,000 parts per million of an active compound of this invention. More preferred rates are in the range of 10 to 10,000 parts per million and the most preferred rates are in the range of 20 to 5,000 parts per million. Such treatments with the compounds of this invention also protect the paint while still in the can from deterioration by fungi.

Damage by mites to stored organic products such as grain, seed, bulbs, tubers, meat or animal hides is kept to a minimum by treating the floors, walls, portions, and other parts of warehouses or other structures with one or more of the active compounds. Applications are made by the use of dusts, sprays, or aerosols with preferred use rates in the range of 0.05 to 1000 grams of the active compound of this invention per 93 square meters of surface to be kept free of excessive mite populations.

The nitrogen-fixing capacity of legumes can be effectively increased by spraying the foilage or by growing the plants in soil treated with the compounds of this invention. The amount of compound required to produce the desired effect will vary from 0.01 to 50 p.p.m. in the soil. As a result of this action the plants are larger and more fruitful than those grown in untreated soil and the soil is left in a more fertile condition for subsequent crops.

The compounds of the invention are useful for controlling a wide variety of mite or fungus diseases of warm-blooded animals.

Thus, for example, the compounds can be used to control the following mites: *Dermanyssus gallinae* which attacks and can even kill domestic birds including chickens and pigeons and *Allodermanyssus sanguineus* which lives on rodents but can attack other animals.

The compounds are useful against many species of fungi, which include but are not limited to the following organisms: dimorphic fungi such as dermatitidis, immitis, capsulatum, compactum, pedrosoi, and schenckii; a dermatophytes such as gypseum, and ouinii, gallinae, mentagrophytes and tonsurans; yeast-like fungi such as neoformans and others such as funigatus and asteroides.

The compounds of this invention can be administered for fungicidal or mite-ovicidal effect according to this invention by any suitable means. For example, the compounds can be formulated as ointments, creams, pastes, external liquids, lotions, dusting powders, or aerosols and thus applied.

The dosage of compounds for this invention administered to the warm-blooded animal will depend upon the type of animal involved, the fungus involved, the frequency of administration and other factors known to those skilled in the art. Generally the fungus can be controlled by applying to the infected area a formulation containing in the range of from 0.025 to 95% by weight of a compound of the invention. A more preferred rate would be from 0.05 to 50% and the most preferred 0.1 to 25% by weight.

Besides the active ingredient of this invention, the formulation applied will contain a solid or liquid nontoxic pharmaceutical carrier for the active ingredient. When suitable sterile products are used, the compounds of the invention can be used for ophthalmic preparations, e.g., as ointments, external liquids, lotions, etc.

In one embodiment, the compound of the invention can be formulated as an ointment, cream or paste. In this formulation generally 0.01 to 10% by weight of the formulation is the active ingredient and the rest is a pharmaceutical base.

Examples of such bases are hydrophilic petrolatum, U.S.P.; hydrophilic ointment, U.S.P.; polyethylene glycol; and ointment, U.S.P. Other official bases or specially formulated bases as are common in the art can also be used.

These formulations are prepared by dissolving or suspending the active ingredient in the base, or a portion of the base, and passing the mix through an ointment mill.

In another embodiment, the active ingredient can be formulated as an external liquid. Generally this formulation will be 0.01 to 10% by weight active and the remainder a solvent system.

The solvent system can be aqueous, alcohol or hydroalcoholic system, e.g., ethanol/water.

This formulation is prepared by dissolving the active in the solvent system, mixing and clarifying by filtration.

The compounds can also be formulated as lotions. The lotions will usually be 0.01 to 10% active and the rest a liquid phase. The liquid phase can be an aqueous system containing suitable wetting and suspending agents or it can be an emulsion of the O/W type, stabilized by suitable surface active agents.

The lotion can be prepared by triturating the active to a smooth paste and then cautiously adding the remaining liquid phase. High-speed mixers or homogenizers can be used to produce better dispersions.

The compounds can be formulated as dusting powders, generally with the compound being 0.01 to 10% of the formulation and the rest powder.

Talc, U.S.P. is the usual powder, although other powders common in the art can be used. The powder can also contain additive agents, such as magnesium stearate, to produce increased flowability.

Aerosol type packaging can be employed to provide a convenient method of dispensing the ointments, creams, pastes, liquids, lotions, or powders previously described. The aerosols are prepared using procedures common in the art.

As was previously set forth, the compounds of this invention are especially suited for use on living plants. Application to the foilage, stems and fruit of plants at the rate indicated above is generally accomplished by employing sprays, dusts or aerosols containing the proper amount of active ingredient. For the control of mites and fungi which are regularly present, applications often start prior to the time that the problem actually appears and continue on a pre-determined schedule. Such a procedure is termed "preventive" or "protective."

With the compounds of this invention, successful control of plant diseases can also be accomplished by applications made after they are present. Fungus mycelia within the plant tissue are actually killed. This approach or effect is termed "curative" or "eradicant" and permits the user to realize considerable savings.

Curative control of plant diseases with the compounds of this invention is enhanced if the treated plant parts are moist for one or more periods of 2 to 12 hours each soon after the active compound is applied. Often the slow drying of an original spray treatment or naturally occurring rains, mists, fogs or dews will accomplish this. Under other circumstances, such as during dry periods or in shelters such as greenhouses, it is necessary to keep the plants moist by some special effort for best result.

When the compounds of this invention are applied, their activity can be enhanced by using certain adjuvants, for example in the water in which the benzimidazole fungicides are dispersed. These adjuvants may be surface-active agents, oils, humectants, enzymes, carbohydrates, and organic acids. They improve the performance on tubers, on foliage, in treatments used for dip application to roots of living plants, in the case of liquids used for injection into the roots or stems of living plants, or in mixtures used to treat fruits, tubers, bulbs, roots, and the like, after harvest.

Surface active agents that enhance fungus control and mite control by the compounds of this invention include sulfonated and sulfated amines and amides, diphenyl sulfonate derivatives, ethoxylated alcohols, ethoxylated alkylphenols, ethoxylated fatty acids, ethoxylated fatty esters and oils, polyethylene oxide polypropylene oxide combinations, alkylsulfonates, fluorocarbon surfactants, glycerol esters, ethoxylated alcohol sulfates, glycol esters, isethionates, sulfated ethoxylated alkylphenols, lanolin derivatives, lecithin and lecithin derivatives, alkanol amides, phosphate derivatives, monoglycerides and derivatives, quaternaries, sorbitan and sorbitol derivatives, sulfosuccinates, alcohol sulfates, sulfated fatty esters, sulfated and sulfonated oils and fatty acids, alkylbenzenesulfonates, imidazolines, taurates, ethoxylated mercaptans, ethoxylated amines and amides, modified phthalic glycerol alkyd resins, and similar materials. The oils include nonphytotoxic aliphatic spray oils and triglycerides, either with or without emulsifier to permit dispersion in water. Humectants such as glycerin or ethylene glycols, enzymes such as bromelin, and carbohydrates such as glucose, lactose, and dextrose are also useful. Organic acids of interest include glycolic and gluconic acids. Although the precise manner in which these additives improve the performance of the fungicides of this invention is not known, the effect is, nevertheless, startling, and it is possible that these additives improve the penetration into the plant or translocation throughout the plant of the fungicides of this invention.

Preferred surface active agents to improve the fungicidal and mite ovicidal activity of these compounds are products such as dioctyl sodium sulfosuccinates ("Aerosol" OT and "Aerosol" OT–B), blends of aromatic sulfonates and ethylene oxide derivatives ("Argrimul" GM, "Agrimul" A–100, "Agrimul" N–100, "Emcol" H50A, "Emcol" H53), polyoxyethylene sorbitol oleate/laurate ("Atlox" 1045A), sodium lauryl sulfate ("Duponol" ME), polyoxyethylated vegetable oils ("Emulphor" EL719), lecithin derivatives ("Emultex" R), acidic complex organic phosphate esters ("Gafac" RE–610, "Victawet"), aliphatic amide alkyl sulfonates ("Hyfoam"

Base LL), oleic acid esters of sodium isethionate ("Igepon" AP78), sodium N-methyl - N - oleoyltaurate ("Igepon" T77), sodium salt of sulfated lauryl and myristyl colamide ("Intramine" Y), polyethylene glycol 400 oleic acid ester ("Nonisol" 210), sodium dodecylbenzene sulfonate ("Sul-Fon-Ate" AA 10, "Ultrawet" K), polyoxyethylene ethers with long-chain alcohols ("Surfonic" LR 30, "Alfonic" 1012-6, "Brij" 30, "Tergitol" TMN), ethylene oxide condensates with propylene oxide/ethylene diamine condensates ("Tetronic" 504), polyhydric alcohol esters ("Trem" 014), modified phthalic glycerol alkyl resins ("Triton" B 1956), quaternaries ("Zelec" DP), alkylphenol ethylene oxide condensate ("Dowfax" 9N4, "Dowfax" 9N10, "Hyonic" 9510, "Tergitols) and the like. Examples given in parentheses are illustrative and do not exclude other unnamed commercial products. Examples of other surface active agents in each of these several categories are listed in "Detergents and Emulsifiers," 1968 Annual, published by John W. McCutcheon, Inc., 236 Mt. Kemble Ave., Morristown, N.J.

Preferred oils include spray oils such as "Orchex" 796 made emulsifiable with "Triton" X-45, castor oil made emulsifiable with "Triton" X-114, corn oil made emulsifiable with "Triton" X-114, Volck Oil #70, Sunoco Oil No. 7E and similar nonphytotoxic spray oils of vegetable, animal or mineral origin.

The preferred rates for these surfactants when used in sprays is in the range from 10 to 10,000 parts per million of the spray fluid. More preferred rates are in the range of 30 to 3,000 parts per million and the most preferred rates are in the range of 100 to 1,000 parts per million.

For dusts, the preferred surfactant rates are in the range of 1,000 to 300,000 parts per million of the material actually applied. More preferred rates are in the range of 5,000 to 200,000 parts per million with the most preferred rates being in the range of 10,000 to 100,000 parts per million.

As previously mentioned, the compounds of the invention are systemic. For systemic applications to above-ground parts, such as foliage, stems and fruit, the presence of a surface-active agent in the spray or dust enhances activity. Use rates for the surface active agent here are the same as for sprays and dusts for preventive or curative control as discussed above. Systemic effect from the treatment of above-ground parts is also enhanced by moisture on the treated surfaces for one or more periods of 2 to 12 hours each.

Systemic control of both mites and fungi on plants is also accomplished by applications to seeds, tubers, bulbs or other reproductive parts prior to planting as well as by application of the chemical to the soil in which the plants to be protected are, or will be, growing. Application to reproductive parts prior to planting is effected through the use of sprays, dips, dusts or aerosols containing one or more of the compounds of this invention. Treatment of soil is accomplished by physical mixing prior to planting, distribution in the furrow at planting time, application in transplant water, placement in the soil in a band or sheet with specialized equipment, injection through irrigation water or by distribution on the field surface.

The fungicidal and mite ovicidal compositions of the invention contain in sufficient amount to exert fungicidal or mite-ovicidal action, one or more compounds of this invention in admixture with a carrier material or conditioning agent of the kind used and commonly referred to in the art as an adjuvant or modifier. The general classes of adjuvants applicable to the compounds of this invention are inert solids, organic liquid solvent, organic liquid or aqueous diluents and surface-active agents. Formulations adapted for ready and efficient application using conventional applicator equipment are prepared by compounding the compounds of this invention with suitable adjuvants by mixing, grinding, stirring or other conventional processes. Normally the active ingredient composes 1–95% by weight of the fungicidal or mite-ovicidal composition.

Solid compositions can be in the form of water-dispersible powders, dusts, pellets and granules. Water-dispersible powders are particularly useful and can be prepared by simple mixing and grinding steps and can be either used as such, diluted with inert solids to form dusts or granules, or suspended in a suitable liquid medium for spray or seed treatment application. The powders usually comprise active ingredient admixed with varying amounts of conditioning agents, surface-active agents and stabilizers. The classes of extenders suitable for the wettable powders of this invention are clays, such as the kaolins, diatomaceous earths, calcium carbonates, sulfur, sodium sulfate, and also synthetic silicas and silicates. Diluents that have been surface reacted, such as organic acid coated calcium carbonate, can also be used. Diluents of organic origin such as walnut shell flour, lignin sulfonate, corn cob flour, or carbohydrates can also be used. In addition, natural or synthetic frangible resins can be used.

Among the preferred diluents are coated calcium carbonate, corn cob flour, starch, sucrose, sulfur, sodium sulfate and partially desulfonated sodium lignin sulfonate. It is also preferred that the diluents be used in an anhydrous state.

The active ingredient usually makes up from about 25–90% of these wettable powder compositions. These wettable powders can also be converted to dusts containing 1–25% of active material by mixing or grinding one or more of the diluents listed above, or with pyrophyllite, volcanic ash and other dense, rapid-settling inert solids. Alternatively, dusts can be prepared by grinding the dust diluents with the active ingredient, or by preparing dust concentrates for further dilution. These dust concentrates can contain from 80–95% of the active ingredient, blended and ground with diluents and, if desired, small amounts of surface-active agents.

For the granule compositions of this invention, the most suitable carriers are of two types. The first are porous, adsorptive, preformed granules, such as preformed and screened granular clays, heat expanded granular screened vermiculite, or granular botanicals. On any of these, a solution or aqueous or nonaqueous suspension of the active agent can be sprayed at concentrations up to 25 weight percent of the total weight. In addition to the active component, the solutions or suspensions can contain surfactant and also binders such as sucrose or swollen starch to aid in adhering small particles of dispersed product to the dried granules. Such adhesive materials may also be surfactants and include such products as polyvinyl alcohol, calcium and magnesium lignin sulfonate in admixture with wood sugars, acrylate and asphalt emulsions, abietates, etc. Oils or other non-volatile liquids like glycols can also be used to improve adhesion.

The second suitable type of carrier is the powdered kaolinitic clays, or bentonitic clays in the sodium, calcium or magnesium forms. These clays are blended with the active components and optionally surfactants to give mixtures that are granulated and dried to yield granular material with the active component distributed uniformly throughout the mass. Other suitable diluents for granulation are sulfur, organic dusts such as corn cob flour, starch, dextrin, sucrose, in conjunction with binders and surfactants. Such granules can also be made with 25 to 30 weight percent active component, but more frequently a concentration of about 10 weight percent is desired for optimum distribution. Similar compositions can be made by extruding the mixture in the presence of moisture or other liquids such as polyethylene glycols and converting the extrusions into granules or pellets by a suitable combination of cutting, drying, and crushing steps. The granular compositions of this invention are most useful in a size range of 15–60 mesh.

Liquid compositions employing one or more of the active compounds of this invention are prepared by admixing the active ingredient with a suitable liquid diluent medium. The active ingredient can be either in solution or in suspension in the liquid medium. Typical of the liquid media which can be used are water, paraffinic spray oils, alkylated naphthalenes, xylene, alcohols, chlorinated hydrocarbons and ketones. The active ingredient usually makes up from about 0.5 to 50% of these liquid compositions. In addition, surface-active agents, particularly emulsifiers, can be present to aid in the suspension or dispersion or to emulsify the composition into water.

Compositions of the invention, especially liquids and wettable powders, contain as a conditioning agent one or more surface-active agents in amounts sufficient to render a given composition readily dispersible in water or in oil. By the term "surface-active agent," it is understood that wetting agents, dispersing agents, suspending agents and emulsifying agents are included.

Suitable surface-active agents include anionic, cationic, and non-ionic types. In general, less than 10% by weight of the surface-active agent is present in the compositions of this invention, although frequently the amount of surface-active agent in these compositions is less than 2% by weight.

Preferred wetting agents are alkylbenzene- and alkylnaphthalenesulfonates, sulfated fatty alcohols, amines or acid amides, long-chain acid esters of sodium isethionate, esters of sodium sulfosuccinate, sulfated or sulfonated fatty acid esters, petroleum sulfonates, sulfonated vegetable oils, and ditertiary acetylenic glycols. Preferred dispersants are methyl cellulose, polyvinyl alcohol, sodium, calcium, and magnesium lignin sulfonates, polymeric alkylnaphthalenesulfonates, polyvinylpyrrolidone derivatives, polymethylene bisnaphthalenesulfonates and sodium N-methyl-N-(long-chain acid)taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender can be replaced by a corrosion inhibitor or an antifoaming agent, or both. In some instances, it may be advantageous to use larger amounts of dispersants such as the lignin sulfonates in wettable powder, pellet, granule and dust compositions. In such a case, the lignin sulfonates additionally act as diluents for powders as binder for granules and pellets.

Emulsifying agents most suitable for the liquid compositions of this invention are alkylaryl polyethoxy alcohols, condensation products of ethylene oxide with long-chain alkyl alcohols, mercaptans or amines, sorbitan fatty acid esters, polyethylene glycol fatty esters, fatty alkylol amide condensates, amine salts of fatty alcohol sulfates, phosphate esters, and oil soluble salts of petroleum sulfonates. Mixtures of emulsifying agents are often preferred. Such emulsifying agents will comprise from about 3 to 10 weight percent of the total composition. As described above, however, much greater amounts of emulsifying agent can be used to give improved results.

The compounds of this invention and the oils, surfactants, humectants, enzymes, carbohydrates, and acids useful to enhance the fungicidal and mite-ovicidal activity of these compounds can be brought together in several ways. For example, the additive which will enhance activity can be mixed with compounds of the invention when spray slurries are being prepared. It is often also possible and convenient to product formulations in which the additive and the compound of the invention will both be present in the composition, which is then convenient to apply. Such compositions can be powders, granules, suspensions, or even solutions, depending upon the physical and chemical characteristics of the components that are to be prepared. It will be readily understood by those skilled in the trade and in the light of the above teachings that the ratios of active ingredient compound to additives may vary widely. Thus, the additive may be present in such mixtures within the range of from 33 to 10,000 parts per 100 parts of the compounds of this invention. More preferred are rates of from 40 to 5,000 parts of additive per 100 parts of active ingredient and a range of ratios from 50 to 3,500 per 100 parts of compound is even more preferred.

Among non-ionic and anionic surfactants, those most suitable for the preparation of the dry, wettable products of this invention are solid forms of compounds known to the art as wetters and dispersants. Occasionally a liquid, non-ionic compound classified primarily as an emulsifier can serve as both wetter and dispersant.

Such compositions can contain, in addition to the active ingredient of this invention, conventional insecticides, miticides, bactericides, nematocides, fungicides, or other agricultural chemicals such as fruit set agents, fruit thinning compounds, fertilizer ingredients and the like, so that the compositions can serve useful purposes in addition to the control of fungi and mite infestations.

The following are illustrative of the agricultural chemicals that can be included in the compositions or, additionally, that may be added to sprays containing one or more of the active compounds.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane( lindane);
2,3,4,5,6,7,8,8-octachoro-4,7-methano-3a-4,7,7a-tetrahydroindane;
1,1,1-trichloro-2,2-bis(p-chlorophenyl)ethane (DDT);
1,2,3,4,10,10-hexachloro-6,7-epoxy-1,4,4a-5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1 (or 3a), 4,5,6,6,8,8-heptachloro-3a-4,7,7a-tetrahydro-4,7-methanoindene;
1,1,1-trichloro-2,2-bis(p-methoxyphenyl)ethane (methoxychlor;
1,1-dichloro-2,2-bis(p-chlorophenyl)ethane;
chlorinated camphene having a chlorine content of 67–69%;
2-nitro-1,1-bis(p-chlorophenyl)butane;
1-naphthyl N-methylcarbamate ("Sevin"®);
methylcarbamic acid, ester with phenol, 4-(dimethylamino)-3,5-dimethyl;
methylcarbamic acid, ester with 1,3-dithiolan-2-one oxime;
O,O-diethyl O-(2-isopropyl-4-methylpyrimid-6-yl) thiophosphate;
O,O-dimethyl 1-hydroxy-2,2,2-trichloroethyl phosphonate;
O,O-dimethyl S-(1,2-dicarbethoxyethyl) dithiophosphate (malathion);
O,O-dimethyl O-p-nitrophenyl thiophosphate (methyl parathion);
O,O-dimethyl O-(3-chloro-4-nitrophenyl) thiophosphate;
O,O-diethyl O-p-nitrophenyl thiophosphate (parathion);
dl-2-cyclopentenyl-4-hydroxy-3-methyl-2-cyclopenten-1-one chrysanthemate;
O,O-dimethyl O-(2,2-dichlorovinyl) phosphate (DDVP);
mixture containing 53.3% "Bulan," 26.7% "Prolan" and 20.0% related compounds;
O,O-dimethyl O-(2,4,5-trichlorophenyl)phosphorothioate;
O,O-dimethyl S-(4-oxo-1,2,3-benzotriazine-3(4H)-yl-methyl)phosphorodithioate ("Guthion"®);
bis(dimethylamino)phosphonous anhydride;
O,O-diethyl O-(2-keto-4-methyl-7-a'-pyranyl) thiophosphate;
O,O-diethyl (S-ethyl mercaptomethyl) dithiophosphate;
calcium arsenate;
sodium aluminofluoride;

dibasic lead arsenate;
2'-chloroethyl-1-methyl-2-(p-tert-butylphenoxy)ethyl sulfite;
azobenzene;
ethyl 2-hydroxy-2,2-bis(4-chlorophenyl)acetate;
O,O-diethyl O-(2-(ethylmercapto)-ethyl) thiophosphate;
2,4-dinitro-6-sec-butyl phenol;
toxaphene;
O-ethyl O-p-nitrophenyl benzenethiophosphonate;
4-chlorophenyl 4-chlorobenzenesulfonate;
p-chlorophenyl phenyl sulfone;
tetraethyl pyrophosphate;
1,1-bis(p-chlorophenyl)ethanol;
1,1-bis(chlorophenyl)-2,2,2-trichloroethanol;
p-chlorophenyl p-chlorobenzyl sulfide;
bis(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy 2'-thiocyanodiethyl ether;
naphthalene;
methyl O-carbamoylthiolacetohydroxamate;
1,1-dichloro-2,2-bis(p-ethylphenyl)ethane;
methyl O-(methylcarbamoyl)thiolacetohydroxamate;
p-dimethylaminobenzenediazo sodium sulfonate;
quinone oxyaminobenzooxohydrazone;
tetraalkyl thiuram disulfides such as tetramethyl thiuram disulfide or tetraethyl thiuram disulfide;
metal salts of ethylene bisdithiocarbamic acid, e.g. manganese, zinc, iron and sodium salts;
pentachloronitrobenzene;
N-dodecylguanidine acetate (dodine);
N-trichloromethylthiotetrahydrophthalimide (captan);
phenylmercury acetate;
2,4-dichloro-6-(o-chloroaniline)-s-triazine ("Dyrene"®);
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide;
3,3'-ethylenebis(tetrahydro-4,6-dimethyl-2H-1,3,5-thiodiazine-2-thione);
methylmercury dicyandiamide;
N-ethylmercury-p-toluenesulfonilide;
1,4-dichloro-2,5-dimethoxy benzene;
metal (e.g. iron, sodium and zinc), ammonium and amine salts of dialkyldithiocarbamic acids;
tetrachloronitroanisole;
hexachlorobenzene;
hexachlorophene;
methylmercury nitrile;
tetrachloroquinine;
N-trichloromethylthiophthalimide;
1,2-dibromo-3-chloropene;
1,2-dibromo-3-chloroprene;
dichloropropane-dichloropropene mixture;
ethylene dibromide;
chloropicrin;
sodium dimethyldithiocarbamate;
tetrachloroisophthalonitrile;
1-benzimidazole carboxylic acid, 2-carboxyamino-dimethyl ester streptomycin;
2-(2,4,5-trichlorophenoxy)propionic acid;
p-chlorophenoxyacetic acid;
1-naphthaleneacetamide; and
N-(1-naphthyl)acetamide.

The agricultural chemicals listed above are merely exemplary of the compounds which can be mixed with the active compounds and are not intended in any way to limit the invention.

The use of pesticides such as those listed above in combination with a compound within the scope of this invention sometimes appears to greatly enhance the activity of the active compound. In other words, an unexpected degree of activity is sometimes seen when another pesticide is used along with the active compound.

The pressures of an expanding world population, together with the need for more economical agricultural practices have resulted in earlier harvesting of grains, including corn. Frequently the grain is stored or sold to grain elevators without proper drying. Spoilage of the grain under these conditions may be quite rapid, with the formation of toxins and other substances that are very harmful or fatal when fed to animals.

Safe, effective feed additives that combat spoilage are thus of great importance to agriculture.

The compounds of this invention can be used to prevent the spoilage of animal feeds. In particular, when mixed with the feed, they provide more efficient and longer lasting protection without harm or injury to livestock that consume it. The compounds of this invention may be conveniently formulated for this use in a number of ways and these formulations may be mixed directly with mixed feed, newly harvested hay and newly harvested grain. These compounds effectively prevent the spoilage of corn, sorghum, wheat, barley, oats, rye and other grains that may be used as livestock feed.

Under normal conditions, these compounds may be incorporated into feeds at rates of from 0.01% to 0.25% with excellent results. Higher rates may be required under very damp conditions.

These compounds can also be used to improve the performance of other feed additives, such as sodium propionate, by mixing the two additives directly, or by adding them separately to the feed to be protected.

The compounds of this invention have an activity which relates to the treatment of sewage, soil or other substances in which natural oxidation processes occur. More specifically, the addition of these benzimidazole compounds to such substrates increases the rate and magnitude of oxidation processes.

Sewage is a dilute aqueous solution of organic wastes which must be treated to prevent pollution of natural water sources. During sewage treatment, complex organic and inorganic molecules are oxidized to simpler molecules, such as carbon dioxide, water and nitrates. Two common techniques for increasing the oxidation, or decomposition, rate of sewage in modern sewage treatment plants are the use of a trickling filter and the use of aeration tanks. The addition of benzimidazole compounds to sewage adds a new technique for increasing the decomposition rate of sewage, and can be used to increase the effects achieved in trickling filters and aeration tanks. When benzimidazole compounds are added to sewage, the result is an increase in the rate of oxygen utilization in the sewage which signifies an increase in the decomposition rate of the sewage.

The compounds of the present invention also possess activity against helminth parasites of warm-blooded animals. Properly formulated and administered, these can be utilized for the treatment of helminthiasis of animals by oral administration.

For example, the subject compounds are useful for the control of infections such as *Trichuris vulpis* in dogs and gastroenteritis in sheep due to such parasites as Ostertagia, Haemonchus and Cooperi species. In addition, nematodes in laboratory mice such as *Aspicularis terap-tera* and others may also be checked. Various ancyclostomes such as *Bunestomium trigenecephalum* and *Ancyclostoma caninum* are also controlled by the compounds of this invention.

Anthelmintic activity is obtained by oral administration of the compounds of this invention mixed with a suitable nontoxic carrier to obtain the active anthelmintic composition. The carrier can be a pharmaceutically acceptable diluent or excipient normally used for the preparation of medicaments and include such materials as lactose, calcium, phosphate, gelatin, pectin and others. Liquid carrier may be taken from such agents as olive oil, sesame oil and water. Alternatively the active ingredients of this invention may be incorporated in a receptacle such as a hard or soft gelatin capsule. The quantity of the active ingredient administered to the animal is in the range of 20 to 600 mg./kg./day.

The following examples illustrate the activity of the compounds of Formula I. All parts are parts by weight unless otherwise indicated.

EXAMPLE 2

An aqueous suspension concentrate is prepared as follows:

| | |
|---|---|
| Methyl 1-[(methoxycarbonyl)thiocarbamoyl]-2-benzimidazolecarbamate | 30.00 |
| Polyacrylic acid, sodium salt | 0.35 |
| Low-viscosity polyvinyl alcohol | 1.50 |
| Water+(sodium hydroxide to a pH of 7.0 added last) | 68.15 |

The active component is ground to pass a 30 mesh screen and is then mixed with the remaining formulation ingredients and sand-ground to a particle size below 5 microns.

Six field crates of oranges are picked from a commercial grove in Florida. Three of these crates of oranges are dipped for 3 minutes in a water bath containing a suspension made from the above formulation, in an amount to give 300 parts per million by weight of the active ingredient of this invention. A polyethylene glycol ester of oleic acid surface active agent is present at the rate of 150 p.p.m. of total liquid. The remaining three crates are dipped in a similar fashion in water with the surface-active agent only. All crates are set aside in a citrus storage house for three weeks. At the end of this time all fruit is examined. The fruit that has been dip-treated with the compound of this invention is still in good condition, but the fruit that is not so protected is largely rotted by the blue mold fungus (*Penicillium digitatum.*)

The following compounds may be similarly formulated and when used as above give like results.

methyl 1-[(phenylacetyl)thiocarbamoyl]-2-benzimidazolecarbamate
methyl 1-[(acetyl)thiocarbamoyl]-2-benzimidazolecarbamate
methyl 1-[(ethoxycarbonyl)thiocarbamoyl]-2-benzimidazolecarbamate
ethyl 1-[(methoxycarbonyl)thiocarbamoyl]-2-benzimidazolecarbamate
isopropyl 1-[(methoxycarbonyl)thiocarbamoyl]-2-benzimidazolecarbamate

EXAMPLE 3

A wettable powder formulation is prepared as follows:

| | |
|---|---|
| Ethyl 1-[(methoxycarbonyl)thiocarbamoyl]-2-benzimidazolecarbamate | 70.0 |
| Diatomaceous earth | 28.7 |
| Alkylaryl sodium sulfonates | 1.0 |
| Methylcellulose | 0.3 |

The above ingredients are blended and micropulverized to a particle size below 50 microns, followed by reblending.

The wettable powder thus prepared is added to water at the rate of 1000 p.p.m. of the active ingredient in water. This suspension is used to spray to the point of run-off, alternate trees in a field planting of apples. Sprays are applied at weekly intervals from April 25 until June 6. From June 6 until the end of the season, the sprays are applied at intervals of two weeks. The remaining trees in the planting are left unsprayed.

In early September all trees are carefully examined. Trees that were sprayed with the compound of this invention are healthy and free of mite infestation and fungus damage. The fruit on the sprayed trees is unblemished and of good size. The foliage of the unsprayed trees, on the other hand, is heavily infested with the apple scab fungus (*Venturia inaequalis*) and the powdery mildew fungus (*Podosphaera leucotricha*). Also the leaves of the unsprayed plants are badly infested with European Red mites (*Panonychus ulmi*). The fruit on the unsprayed trees is spotted with scab and of small size.

The following compounds may be similarly formulated and when used as above give similar results.

methyl 1-[(benzoyl)thiocarbamoyl]-2-benzimidazolecarbamate
methyl 1-[(ethoxycarbonyl)thiocarbamoyl]-2-benzimidazolecarbamate
methyl 1-[(methoxycarbonyl)thiocarbamoyl]-2-benzimidazolecarbamate
isopropyl 1-[(methoxycarbonyl)thiocarbamoyl]-2-benzimidazolecarbamate

EXAMPLE 4

A wettable powder formulation is prepared from the following ingredients:

| | |
|---|---|
| Methyl 1-[(phenylacetyl)thiocarbamoyl]-2-benzimidazolecarbamate | 50.0 |
| Kaolinite | 47.0 |
| Sodium lignin sulfonate | 1.0 |
| Dioctyl sodium sulfosuccinate | 2.0 |

These ingredients are mixed, blended and micronized to a particle size below 10 microns, followed by reblending.

A uniform field planting of cantaloupe in North Carolina is inoculated with the powdery mildew fungus (*Erysiphe cichoracearum*). After 10 days this organism has become well established in the plants.

At this time alternate rows are sprayed with water containing a suspension of the wettable powder prepared as described above and an added amount of a polyhydric alcohol ester surface-active agent ("Trem" 014). The concentration of this chemical suspension is such as to give 227 grams of the active compound of this formulation per 378 liters of water. (0.06%) and 400 p.p.m. of the surfactant. The spray is applied at a volume of 1410 liters per hectare. The remaining rows are left unsprayed.

After another 15 days the unsprayed rows are heavily damaged by powdery mildew and some of the plants are dying. The sprayed rows, however, are healthy and growing rapidly. The results indicate that the active compound of the suspension acts as a curative fungicide.

Also, in the above example, the following surface-active agents may be substituted for like compounds of "Trem" 014 with similar results.

Sodium lauryl sulfate ("Duponol" ME)
Polyoxyethylene sorbitol oleate/laurate ("Athex" 1045 A)

EXAMPLE 5

The following formulation is prepared by intimately blending the ingredients and grinding the blend in an air attrition mill until the particle size is substantially less than 5 microns and then reblending.

| | |
|---|---|
| Methyl 1-[(methylthiolcarbonyl)thiocarbamoyl]-2-benzimidazolecarbamate | 50.0 |
| Dioctyl sodium sulfosuccinate | 3.0 |
| Low-viscosity methylcellulose | 0.5 |
| Pentaerythritol | 46.5 |

Acid-delinted cotton seed, already treated with 85 grams of tetramethylthiuram disulfide per 45.3 kilograms of seed, is overtreated in a slurry treater with the formulation described above, in such a way as to provide 113 grams of the active ingredient per 45.3 kilograms of seed. A similar lot of seed, treated with tetramethylthiuram disulfide only, is used for purposes of comparison. The two lots of seed are planted in alternating rows in the same field. The seed treated with tetramethylthiuram disulfide only emerges to a good stand but many seedlings die later due to post-emergence damping off, and growth of the surviving plants is poor due to *Rhizoctonia solani*. Most of the seedlings that do survive exhibit soreshin lesions caused by Rhizoctonia. The seeds over-treated with the above formulation, on the other hand, result in a stand that suffers little post-emergence damping off and grows rapidly.

EXAMPLE 6

The following formulation is prepared by intimately blending the following ingredients and micropulverizing them until the particles are substantially all below 20 microns.

| | |
|---|---|
| Methyl 1[(acetyl)thiocarbamoyl]-2-benzimidazolecarbamate | 50.0 |
| Oleic acid ester of sodium isethionate | 2.0 |
| Sodium lauryl sulfate | 1.0 |
| Synthetic fine silica | 7.0 |
| Kaolinite | 40.0 |

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops prematurely. Also the untreated trees have poor twig growth and small, spotted fruit. The trees sprayed with the above formulation are essentially free of mites, their eggs and apple scab. As a result of the excellent mite control, the sprayed trees have foliage of a thrifty, dark green color, and they exhibit good twig growth and fruit size.

EXAMPLE 7

A wettable powder formulation is prepared from the following ingredients in the proportions given:

| | |
|---|---|
| Methyl 1-[(phenylacetyl)thiocarbamoyl]-2-benzimidazolecarbamate | 25.0 |
| Methyl O-(methylcarbamoyl)thiolacetohydroxamate | 10.0 |
| Oleic acid ester of sodium isethionate | 2.0 |
| Sodium lauryl sulfate | 2.0 |
| Diatomaceous silica | 61.0 |

All ingredients are combined and rotated in a blender until uniformly admixed. The total mix is then air-milled to produce particles most of which are less than 10 microns in particle size.

A sufficient amount of the above wettable powder is added to water such that there are 2.5 grams per liter of water of the methyl O-(methylcarbamoyl)thiolacetohydroxamide. The resulting suspension is then sprayed at weekly intervals on one pair of similar, adjacent plots in a green bean field in Florida at the rate of two kilograms of methyl 1-[(phenylacetyl)thiocarbamoyl]-2-benzimidazolecarbamate per hectare. The test area is selected as one in which there is a high infestation of the two-spotted mite, *Tetranychus unticae,* and the Mexican bean beetle, *Epilachna varivestis.* The plot sprayed with the above formulation remains free of both the two-spotted mite and the Mexican bean beetle for the entire growing season and provides a good yield of greenbeans. The unsprayed plot is attacked by both of the above pests and is damaged to the extent that the yield is greatly reduced. Similar areas sprayed with methyl O-(methylcarbamoyl) thiolacetohydroxamate alone or free from attack by the Mexican bean beetle but are damaged by the two-spotted mite.

In the above example, methyl O-(carbamoyl)thioacetohydroxamate may be substituted for methyl O-(methylcarbamoyl)thiolacetohydroxamate with essentially equivalent results.

EXAMPLE 8

A wettable powder formulation is prepared from the following ingredients in the proportions given:

| | |
|---|---|
| Methyl 1-[(methoxycarbonyl)thiocarbamoyl]-2-benzimidazolecarbamate | 30.0 |
| Methoxychlor | 30.0 |
| Sodium lauryl sulfate | 1.0 |
| Neutral sodium lignin sulfonate (Marasperse N) | 39.0 |

All of the ingredients are combined and rotated in a blender until uniformly mixed. The total mix is then air-milled to produce particles essentially less than 40 microns in size.

The wettable powder prepared above is added to water in an amount such that there are 2.5 grams of each of the active ingredients per liter of water. The resulting suspension is sprayed at the rate of 10 kilograms per hectare for each of the active ingredients over a plot in a Bermudagrass turf area in Florida. The area selected for the test is heavily infested with a plant-feeding mite, *Aceria neocynodomis,* and chinch bugs, *Blissus leucopterus-insularis.* The chinch bugs are killed in the treated plot and the mite infestation soon disappears. The turf quickly returns to a healthy and active condition.

In a similar untreated plot both the mites and the chinch bugs continue to multiply and, by their feeding, the Bermudagrass becomes discolored and the turf reflects many unsightly dead spots. Similar plots sprayed with methoxychlor only are free of damage due to the chinch bugs but are injured by the high mite infestation.

EXAMPLE 9

The following formulation is prepared by intimately blending the ingredients and grinding the blend in an air attrition mill until the particle size is substantially less than 5 microns and then reblending.

| | |
|---|---|
| Methyl 1-[(methoxycarbonyl)thiocarbamoyl]-2-benzimidazolecarbamate | 85.0 |
| Alkylnaphthalenesulfonic acid, sodium salt | 1.5 |
| Sodium N-methyl-N-oleoyltaurate | 2.0 |
| Synthetic fine silica | 11.5 |

Four similar potted bean plants (one plant per pot) are selected. The soil in two of these pots is drenched with a water suspension of the wettable powder formulation described above at a rate to provide 30 parts per million by weight in the total amount of soil in the pot. The remaining two pots are left untreated.

Five days after treatment 50 adult mites (*Tetranychus urticae*) are placed on a terminal leaf on each of the test plants. Twenty-four hours later these adult mites, all still alive, are transferred to untreated bean foliage. After another twenty four hours all of the adult mites are removed in a way which causes no damage to the eggs that have been laid during the twenty-four hour period on the untreated foliage.

The number of eggs laid by each batch of 50 mites is essentially the same. A sufficient time is allowed for all viable eggs to hatch. Counts demonstrate that none of the eggs hatch from among those laid by mites that had fed on foliage from pots with soil containing the compound of this formulation. Hatch to provide living young was complete, on the other hand, among eggs laid by mites similarly handled except that the plants providing sustenance were not in contact with the compound of this formulation. This experiment demonstrates systemic movement in plants and mite-ovicide effect.

The following compounds can be similarly formulated and when used as above give like results.

methyl 1-[(ethoxycarbonyl)thiocarbamoyl]-2-benzimidazolecarbamate
methyl 1-[(methylthiolcarbonyl)thiocarbamoyl]-2-benzimidazolecarbamate

EXAMPLE 10

A dust concentrate is prepared as follows:

| | |
|---|---|
| Isopropyl 1-[(methoxycarbonyl)thiocarbamoyl]-2-benzimidazolecarbamate | 80.0 |
| Terra alba | 20.0 |

The above ingredients are blended and milled to a particle size below 10 microns, followed by reblending.

Two experimental lots of house paint are prepared in a similar manner except that 0.5% by weight of the active compound of this formulation is milled with the dry ingredients in one lot, whereas none of the concentrate was added to the other lot. Test boards were painted with each lot. After one year of exposure in Florida, the board with the paint to which the concentrate was not added was badly stained by fungus growth including species of Penicillium and other genera. The board with the paint containing the compound of this invention remained bright.

EXAMPLE 11

A dilute dust is prepared as follows:

| | |
|---|---|
| Dust concentrate formulation of Example 10 | 10 |
| Ground phosphate rock | 90 |

The above ingredients are blended to form a free flowing dust.

A uniform cherry orchard in Michigan is selected for the test. Alternate trees are dusted every 14 days at the rate of 2 pounds per tree with the above dust formulation. The remaining trees are left unprotected.

On September 1 the trees are examined. The trees that had been dusted with the compound of this invention are green and healthy, with all leaves remaining on the trees. At this time the foliage of the unprotected trees is largely discolored due to attack by the leaf spot fungus (*Coccomyces hiemalis*) and the two spotted mite (*Tetranychus urticae*). Further, much of the foliage of the unprotected trees has fallen due to the effect of the two pests.

The following compounds may be similarly formulated and when used as above give like results.

methyl 1-[(acetyl)thiocarbamoyl]-2-benzimidazolecarbamate
methyl 1-[(benzoyl)thiocarbamoyl]-2-benzimidazolecarbamate
methyl 1-[(phenylacetyl)thiocarbamoyl]-2-benzimidazolecarbamate

EXAMPLE 12

A dilute dust is prepared as follows:

| | |
|---|---|
| Ethyl 1-[(methoxycarbonyl)thiocarbamoyl]-2-benzimidazolecarbamate | 5.0 |
| Pyrophyllite | 95.0 |

The active ingredient and an equal amount of pyrophyllite are first blended and micropulverized to a particle size smaller than 100 microns, then reblended with the remainder of the diluent.

Sugar cane seed pieces cut in November are divided into eight lots. Four of these lots are dusted in such a way as to cover all surfaces with the dust prepared as described above. The other four lots are dusted with the inert diluent only. All lots are stored under similar conditions until the following February at which time they are examined. The four lots that had been treated with the compound of this invention are in good condition. The four unprotected lots, on the contrary, are so badly rotted by fungi of the genus Fusarium that they cannot be planted.

EXAMPLE 13

| | |
|---|---|
| Methyl 1-[(methoxycarbonyl)thiocarbonyl]-2-benzimidazolecarbamate | 50.0 |
| Dioctyl sodium sulfosuccinate (Aerosol OTB) | 3.0 |
| Low-viscosity methylcellulose (Methocel 15) | 0.5 |
| Sucrose (commercial cane sugar) | 48.5 |

The above components are blended and micropulverized, then air-milled until the active component is substantially all below 5 microns.

The above 50% wettable powder formulation is dispersed in water to give an active ingredient concentration of 3.6 grams per liter of water. Eight uniform apple trees of the same variety are selected for testing. Four of these are sprayed to run-off, which is approximately 2850 liters per hectare, at weekly intervals during the growing season with the above formulation, and the other four trees are left unsprayed.

By the end of the season the unsprayed trees have developed very high populations of orchard mites and are highly infected with apple scab, *Venturia inaequalis*. Due to the feeding of the mites, the foliage is russeted and drops prematurely. Also, the untreated trees have poor twig growth and small, spottel fruit.

The trees sprayed with methyl 1-[(methoxycarbonyl)thiocarbamoyl]-2-benzimidazolecarbamate are essentially free of mites, their eggs and apple scab. As a result of the excellent mite control, the sprayed trees have foliage of a thrifty, dark green color, and they exhibit good twig growth and fruit size.

EXAMPLE 14

| | |
|---|---|
| Methyl 1-[(ethoxycarbonyl)thiocarbamoyl]-2-benzimidazolecarbamate | 60.0 |
| Dioctyl sodium sulfosuccinate | 3.0 |
| Low-viscosity methylcellulose | 0.5 |
| Sulfur (crude) | 18.5 |
| Pentaerythritol | 18.5 |

The above composition was blended, micropulverized and air milled twice.

Test plots are established in a rice field. The plots are sprayed with water containing a suspension of the wettable powder described above along with a polyhydric alcohol ester surface-active agent ("Trem" 014). The amount of the wettable powder used is such as to provide 1.5 grams of the active compound of this invention per liter of water. The amount of "Trem" 014 is 400 p.p.m. in the final spray. The spray is applied at weekly intervals at the rate of 900 liters per hectare. The remainder of the field is left unsprayed. Three months after the start of the test, the sprayed plots are healthy and growing well. The untreated plots on the other hand, are seriously damaged by the rice blast fungus (*Piricularia oryzae*), which greatly reduces yield.

EXAMPLE 15

The following ingredients are converted into a dust as indicated:

| | |
|---|---|
| Methyl 1-[(methoxycarbonyl)thiocarbamoyl]-2-benzimidazolecarbamate | 20.0 |
| Pyrophyllite | 79.0 |
| Alkylnaphthalenesulfonic acid, sodium salt | 1.0 |

Equal parts of the active ingredient and the diluent are hammer-milled with the surfactant and then diluted with the remaining pyrophyllite in a ribbon blender. The components are then blended until they are homogeneous.

Cotton plants in selected plots are thoroughly dusted at a rate of 10 kilograms of dust per hectare for each application on June 20 and at two-week intervals thereafter until mid-August with the above dust formulation in addition to a regular insecticidal program. Similar plots receive the insecticidal application only. By late August the plots receiving the insecticide only have a high incidence of boll rot caused by *Aspergillus niger* and high populations of spider mites, *Tetranychus* spp., which cause the leaves of the cotton plants to turn rusty brown, twist and drop to the ground. Many bolls are completely rotted and loss of leaves results in the shedding of small bolls and prevents the lint from becoming fully developed. Cotton plants treated with the above dust formulation retain healthy foliage and produce a heavy crop of healthy full-sized bolls.

The following compounds may be similarly formulated and when used as above give like results.

ethyl 1-[(methoxycarbonyl)thiocarbamoyl]-2-benzimidazolecarbamate isopropyl 1-[(methoxycarbonyl)thiocarbamoyl]-2-benzimidazolecarbamate

EXAMPLE 16

A dust formulation is prepared from the following ingredients in the proportions listed:

| | |
|---|---|
| Methyl 1-[(methylthiolcarbonyl)thiocarbamoyl]-2-benzimidazolecarbamate | 5.0 |
| Methoxychlor | 5.0 |
| Sodium alkylnaphthalenesulfate | 1.0 |
| Minus 270 mesh corn cob flour | 89.0 |

The above ingredients are combined and rotated in a blender until uniformly mixed. The composition is then milled to produce particles essentially less than 50 microns in diameter. The above-prepared dust is then applied to a special planting of tea roses. The planting consists of uniform plots each with three varieties of rose. The test period extends from June 1 through August 31. At the end of the test period the roses in all unprotected plots are seriously damaged by the spider mite, *Tetranychus urticae*, the rose blackspot, *Diplocarpon rosae*, and the Japanese beetle, *Popillia japonica*. Randomly selected plots dusted at weekly intervals with the above prepared composition to the extent that thorough coverage of the plant is obtained with the formulation, remain free from damage, and produce good yields of bloom throughout the test period.

Plots treated with a dust containing methoxychlor but without methyl 1-[(methylthiolcarbonyl)thiocarbamoyl]-2-benzimidazolecarbamate show no Japanese beetle injury. However, they are seriously damaged by mites and blackspot.

Any of the compounds of this invention mentioned in previous examples may be substituted for the active shown here, with similar results.

EXAMPLE 17

An aqueous suspension concentrate is prepared as follows:

| | |
|---|---|
| Methyl 1-[(methoxycarbonyl)thiocarbamoyl]-2-benzimidazolecarbamate | 30.00 |
| Polyacrylic acid, sodium salt | 0.35 |
| Low-viscosity polyvinyl alcohol | 1.50 |
| Water+(sodium hydroxide to a pH of 7.0 added last) | 68.15 |

The active compound is ground to pass a 30 mesh screen and is then mixed with the remaining formulation ingredients and sand ground to a particle size below 5 macrons.

Green pine lumber coming from the saw in a mill is dipped for two minutes in a bath containing a suspension of the formulation prepared as described above. The amount of suspension concentrate used is such as to provide 400 parts per million of the active compound in the bath. Similar lumber is not dipped. All of the lumber is piled together in a seasoning yard. After three months the lumber is examined. The lumber that has been dipped treated was all bright and clean. The unprotected lumber was heavily covered with green mold (*Penicillium* spp.).

EXAMPLE 18

A granular formulation is prepared as follows:

| | |
|---|---|
| Granular corn cob (15–30 mesh) | 90.0 |
| Methyl 1-[(methylthiolcarbonyl)thiocarbamoyl]-2-benzimidazolecarbamate | 10.0 |

The active compound is dissolved in warm chloroform and the chloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilograms of active chemical of this invention per 3600 meters of row. The remaining rows are untreated.

Six weeks after planting, many of the plants in the rows without the granules are dead, and others show soreshin lesions caused by *Rhizoctonia solani* as well as heavy populations of the Pacific mite (*Tetranychus pacificus*). In the rows that had received the granules, all plants remain alive and are healthy, and further they are free of mites. The effect on mites is clearly systemic.

The following compounds may be similarly formulated and when used as above give similar results.

methyl 1-[(acetyl)thiocarbamoyl]-2-benzimidazole carbamate methyl 1-[(benzoyl)thiocarbamoyl]-2-benzimidazole-carbamate

EXAMPLE 19

An aerosol is prepared from the following ingredients in the proportions given:

| | |
|---|---|
| Ethyl 1-[(methoxycarbonyl)thiocarbamoyl]-2-benzimidazolecarbamate | 3.0 |
| Methylene chloride | 22.0 |
| Freon 11 (trichloromonofluoromethane) | 37.5 |
| Freon 12 (dichlorodifluoromethane) | 37.5 |

The active ingredient is dissolved in the methylene chloride and then loaded into the aerosol container. This is followed by cold loading of the Freons.

Alternate rose bushes growing in a greenhouse are misted lightly at weekly intervals with the aerosol described above. After two months of this program the treated plants are healthy, with dark green attractive foliage and are growing well. The untreated plants, on the other hand, have much foliage discolored and curled due to the infection by the rose powdery mildew organism *Sphaerotheca humuli*. Other foliage on the untreated plants is yellowed due to attack by the Atlantic mite (*Tetranychus atlanticus*). Due to the extensive foliage damage, the plants not treated with the compound of this invention grow more slowly than the protected plants.

The following compounds may be similarly formulated and when used as above give good results:

methyl 1-[(methoxycarbonyl)thiocarbamoyl]-2-benzimidazolecarbamate isopropyl1-[(methoxycarbonyl)thiocarbamoyl]-2-benzimidazolecarbamate methyl 1-[(ethoxycarbonyl)thiocarbamoyl]-2-benzimidazolecarbamate methyl 1-[(acetyl)thiocarbamoyl]-2-benzimidazolecarbamate The above aerosol is sprayed on oranges which are then inoculated with *Penicillium digitatum*. Ten days later, the treated fruit is free of disease whereas untreated fruit is covered with green mold.

EXAMPLE 20

| | |
|---|---|
| Methyl 1 - [(benzoyl)thiocarbamoyl] - 2-benzimidazolecarbamate | 51.6 |
| Alkylnaphthalenesulfonate, sodium salt ("Alkanol" B) | 5.0 |
| Polyvinylpyrrolidone derivative ("Ganex" V 904) | 1.0 |
| Calcium carbonate surface-reacted with propionic acid | 42.4 |

The mixture is prepared by pre-drying all the compounds and then blending, micropulverizing, and finally airmilling until the particle size is below about five microns.

Test plots are established in a rice field. These are sprayed with water containing a suspension of the wettable powder described above along with an aliphatic amide alkyl sulfonate surface-active agent ("Hyfoam" Base LL). The amount of the wettable powder used is such as to provide 1.5 grams of the active compound of this invention per liter of water. The amount of "Hyfoam" Base LL used is 400 p.p.m. in the final spray. The spray is applied at weekly intervals at the rate of 900 liters per hectare. The remainder of the field is left unsprayed.

Three months after the start of the test, the sprayed plots are healthy and growing well. The untreated plots, on the other hand, are seriously damaged by the rice blast fungus, *Piricularia oryzae* which greatly reduces yield.

EXAMPLE 21

The formulation of Example 20 is also useful in controlling Sigatoka disease of banana caused by the fungus *Ceicospora musae.* This is demonstrated by a field test in which designated areas in a banana plantation are treated with 400 grams of the active ingredient of this invention per hectare and an equal amount of a polyhydric alcohol ester surface-active agent ("Trem" 014) applied in an amount of water sufficient to assure good distribution. The treatment is applied at intervals of 14 days.

Four months after the start of the test the banana plants in the treated plots are free from disease, whereas, the untreated plants are heavily damaged by Sigatoka disease.

EXAMPLE 22

| | |
|---|---|
| Methyl 1-[(ethoxycarbonyl)thiocarbamoyl]-2-benzimidazolecarbamate | 72.2 |
| Sodium lauryl sulfate ("Duponol" WA) | 1.5 |
| Oleic acid ester of sodium isothionate ("Igepon" AP 78) | 2.0 |
| Diatomaceous earth ("Celite" 209) | 24.3 |

The mixture is prepared by blending the ingredients, hammer-milling, and then air-milling twice to obtain a very finely-divided powder.

A test is established in a field planting of celery in Florida. Random plots established in a field are sprayed with water containing a suspension of the wettable powder described above. The amount of wettable powder used is such as to provide two grams of active compound of this invention per liter of water. The spray is applied weekly at the rate of 1000 liters per hectare. The remainder of the field is left unsprayed.

Three months after the first spray application, the sprayed celery plots are in a healthy condition and obviously growing well. The untreated portions of the field on the other hand are seriously infested with the early blight fungus (*Cercospora apii*). The disease causes the death of much of the foliage and reduces the growth and market volume of the plants.

EXAMPLE 23

The formulation of Example 22 is also useful in controlling peach scab caused by the fungus *Cladosporium carpophilum.* This is demonstrated by a field study in which random trees in a peach planting are sprayed, starting in the spring, with water containing a suspension of the wettable powder described in the example along with an acid complex organic phosphate ester surface active agent ("Gafac" RE-610).

The amount of the wettable powder used is such as to provide 2.5 grams of the active compound of this invention per liter of water. The amount of "Gafac" RE-610 employed is 400 p.p.m, in the final spray.

The spray is applied on a normal peach fungicide schedule at the rate of 2000 liters per hectare of peach trees. The remaining trees in the planting are left unsprayed.

At the time of harvest fruit on the treated trees are healthy and attractive to consumers. Conversely, fruit from the untreated trees is spotted with scab and of reduced market value.

EXAMPLE 24

| | |
|---|---|
| Methyl 1 - [(methoxycarbonyl)thiocarbamoyl]-2-benzimidazolecarbamate | 51.6 |
| Alkylnaphthalenesulfonate, sodium salt (Petro Ag Special) | 4.0 |
| Neutral, partially desulfonated sodium lignin sulfonate ("Marasperse N") | 44.4 |

The surfactants are heated to remove free moisture, and after again being cooled they are blended with the active ingredient. The mixture is air-milled to obtain a homogeneous wettable powder of fine particle size.

A uniform field planting of sugar beets in Ohio is selected. Alternate rows are sprayed with water containing a suspension of the wettable powder described above along with a dioctyl sodium sulfosuccinate surface-active agent ("Aerosol" OT). The amount of the wettable powder used is such as to provide one gram of the active compound of this invention per liter of water. The amount of "Aerosol" OT used is such as to provide 250 p.p.m. in the final spray. The spray is applied at weekly intervals at the rate of 1000 liters per hectare. The remaining rows are left unsprayed.

Twelve weeks after the initiation of the test, the sprayed rows of sugar beets are healthy and growing rapidly. The untreated rows, on the other hand, are heavily infected with the leaf spot fungus. *Cerospora beticola.* As a consequence of this fungus infection, the plants in the untreated rows are growing slowly and will clearly provide less yield.

EXAMPLE 25

The formulation of Example 24 is also useful in controlling powdery mildew of grapes caused by the fungus *Uncinula necator.* This is demonstrated by a field test in which alternate rows of grapes growing in California are sprayed with a water suspension of the wettable powder containing two grams of the active ingredient per liter. To the spray suspension is also added 300 p.p.m. of sodium N-methyl-N-oleoyltaurate ("Igepon" T 77). The sprays are applied to the treated rows weekly at the rate of 1200 liters per hectare.

Near the end of the growing season (after 14 weekly treatments) the grape vines in the treated rows are healthy and growing well. The untreated rows, however, are heavily diseased with powdery mildew and, as a consequence, growing slowly. The berries on the untreated vines are discolored and broken.

EXAMPLE 26

A granular formulation is prepared as follows:

| | |
|---|---|
| Granular corn cob | 90.0 |
| Isopropyl 1 - [(methoxycarbonyl)thiocarbamoyl]-2-benzimidazolecarbamate | 10.0 |

The active compound is dissolved in warm chloroform and the cloroform solution is sprayed on the granular corn cob which is being tumbled in a mixer. Evaporation of the chloroform yields a finished granule in which the active ingredient is absorbed.

A field in California is seeded with cotton in the normal manner, except that granules prepared as set forth above are added to alternate rows. These granules are dropped in such a way that some fall into the furrow and some are mixed with the covering soil. The rate of granule application is such as to employ 0.45 kilogram of active chemical of this invention per 3600 meters of row. The remaining rows are untreated.

Six weeks after planting, many of the plants in the rows without the granules are dead, and others show soreshin lesions caused by *Rhizoctonia solani* as well as heavy populations of the Pacific mite (*Tetranychus pacificus*). In the rows that had received the granules, all plants remain alive and are healthy, and further they are free of mites. The effect on mites is clearly systemic.

EXAMPLE 27

The following ingredients are blended and ground twice in a pin mill to obtain a powder in which the particles of active ingredient are below 10 microns in size.

| | |
|---|---|
| Methyl 1 - [(methoxycarbonyl)thiocarbamoyl] - 2-benzimidazolecarbamate | 50.0 |
| "Rhodamin" B extra | 2.0 |
| "Tergitol" 12–P–9 (dodecylphenol reacted with 9 moles of ethylene oxide) | 3.0 |
| Sodium lignin sulfonate | 5.0 |
| "Ser-X" (serite) | 40.0 |

The above formulation is applied to wheat seed infested with covered smut (*Tilletia caries*; *Tilletia foetida*), and loose smut (*Ustilago tritici*) at the rate of three ounces per bushel in standard dust treating equipment. Arasan® 75 is added simultaneously at the rate of 1 oz./bushel, for additional protection against pythium. The seed is planted, and examination of the crop at maturity reveals excellent control of these disease organisms.

This formulation may likewise be used to control covered and loose smut of oats, barley, and covered smut of sorghum. It may also be used as a slurry treatment if so desired.

EXAMPLE 28

The following formulation is prepared by mixing the active ingredients, blending and micropulverizing.

| | |
|---|---|
| Methyl 1 - [(methoxycarbonyl)thiocarbamoyl] - 2-benzimidazolecarbamate | 50.0 |
| "Ser-X" (serite) | 50.0 |

The above formulation is applied as a drill box treatment at the rate of 3 oz./bu. to sorghum. The dust and seed are well-mixed as they are added to the drill box. As the seed is drilled into the soil, it is coated with the dust treatment and excess dust falls into the drill row. The sorghum germinates and grows well giving an excellent yield of seed. Excellent control of covered smut (*Sphacelotheca sorghi*) is obtained.

EXAMPLE 29

A dust formulation is prepared from the following ingredients by blending and double micropulverizing:

| | |
|---|---|
| Methyl 1 - [(methoxycarbonyl) thiocarbamoyl] - 2-benzimidazolecarbamate | 10.5 |
| Sodium lignin sulfonate ("Marasperse" N–22) | 80.5 |

This formulation is thoroughly mixed with several portions of a commercial protein dairy feed mixture at rates of from 0.01% (0.2 pound per ton of feed) to 0.2% (4 pounds per ton of feed). At these rates, excellent control of mold growth is obtained.

At rates of 0.08% and above, mold growth is prevented for 26 days with only a trace of ammonia evolution. Under similar conditions in an identical but untreated feed sample, mold growth is observed after 12 days and at this time substantial ammonia evolution is observed.

All of the compounds of this invention can be formulated and mixed with feeds such as that described above, or with newly harvested grains, such as corn or sorghum for the prevention of their spoilage when used as animal feeds.

EXAMPLE 30

The wettable powder formulation of Example 20 is diluted with calcium carbonate coated with about 1% propionic acid to form a 10% powder. This powder is substituted for the dust formulation of Example 28 with similar results.

EXAMPLE 31

A canvas bag containing about 3 pounds of methyl 1-[(methoxycarbonyl)thiocarbamoyl] - 2 - benzimidazolecarbamate (I) is suspended in the aeration tank of an activated sludge sewerage treatment plant. The tank is filled with material from a settling tank and recycled sludge. Air enters the tank at the bottom and rises through the activated sludge as a series of fine bubbles. The action of the bubbles causes mixing to occur as I dissolve, and it is thoroughly mixed throughout the tank. Normally, the sewage would remain in the aeration tank for a period of 9–10 hours. However, the addition of I permits removal of the material from the tank after a shorter period of time.

EXAMPLE 32

The compounds of this invention are useful for the treatment of helminth infections of economically important farm animals.

When methyl 1-[(methoxycarbonyl)thiocarbamoyl]-2-benzimidazolecarbamate is administered orally to sheep at 15 mg./kg. in the form of a drench or capsule, Haemonchus, Ostertagia, Strongyloides, Cooperia and other helminths of the abomasum, small and large intestines are removed.

When cattle are treated with 20 mg./kg. of this compound administered orally in the form of a drench or capsule; Ostertagia, Cooperia, Strongyloides and other helminth parasites are eliminated from the treated animals.

Equally satisfactory results are obtained against infections in swine with *Ascaris suum*, *Strongyloides ransomi* and *Trichuris suis* from treatment by a dosage in the form of a capsule of 30 mg./kg. Incorporation of methyl 1 - [(methoxycarbonyl)thiocarbamoyl]-2-benzimidazolecarbamate in swine feed at 0.05% is successful in suppressing the verminous pneumonia of pigs challenged with living ova of *A. summ*.

Chickens are cleared of helminth infections with *Ascaridia galli* and *Hetamakis gallinae* by adding 0.05% of the subject compound to the poultry feed and feeding the infected birds for 24 hours on this ration.

EXAMPLE 33

A dilute dust is prepared as follows:

| | |
|---|---|
| Dust concentrate formulation of Example 10 | 10.0 |
| Tobacco dust | 90.0 |

The above ingredients are blended to form a free flowing dust.

A uniform cherry orchard in Michigan is selected for the test. Alternate trees are dusted every 14 days at the rate of 910 grams per tree with the above fungicidal dust formulation. The remaining trees are left unprotected. On September 1 the trees are examined. The trees that had been dusted with compound of this invention are green and healthy, with all leaves remaining on the tree. At this time the foliage of the unprotected trees is largely discolored due to attack by the leaf spot fungus (*Coccomyces hiemalis*) and the two-spotted mite (*Tetranychus urticae*.) Further, must of the foliage of the unprotected trees has fallen due to the effect of the two pests.

EXAMPLE 34

An aqueous suspension concentrate is prepared as follows:

| | Parts |
|---|---|
| Methyl 1-[(methoxycarbonyl)thiocarbamoyl]-2-benzimidazolecarbamate (I) | 30.00 |
| Polyacrylic acid, sodium salt | 0.35 |
| Low-viscosity polyvinyl alcohol | 1.50 |
| Water and (sodium hydroxide to a pH of 7 added last) | 68.15 |

The active compound is ground to pass a 30-mesh screen and then mixed with the remaining formulation ingredients and mulled in a sand-grinder until the particle size is below 5 microns.

The above aqueous suspension is tested for effectiveness on a trickling filter. In this instance, the aqueous suspension is pumped into the sewage stream that feeds the rotary distributors on the trickling filter; the ratio of the two streams is such that the concentration of (I) is 10 p.p.b. in the sewage. The treatment period lasts one week. At the start of treatment, the trickling filter is effective in removing 60% of the oxygen demand from the sewage; but at the end of the treatment period, an 80% oxygen demand removal is recorded for the same throughput rate.

EXAMPLE 35

A granular formulation is prepared as follows:

| | |
|---|---|
| Granular corn cob | 90.0 |
| Ethyl 1-[(methoxycarbonyl)thiocarbamoyl]-2-benzimidazolecarbamate | 10.0 |

The active compound is dissolved in warm chloroform and the chloroform solution is sprayed on the granular corn cob which is being tumbled in a mixer. Evaporation of the chloroform yields a finished granule in which the active ingredient is absorbed.

A field test is suitable to show the effect of the compounds of this invention on soybeans. The plot area is prepared by discing a low-nitrogen fertilizer into the soil. Prior to planting, the above formulation is incorporated into the soil to provide rates of applications of 0.0, 0.5, 1.0, and 2.0 kilograms per hectare on a band 24 centimeters wide. Kent soybeans are drilled in the treated soil in rows with about 2.5 centimeters between seeds. The plots are 6 meters long and are replicated 5 times in a random block design. At regular intervals throughout the test, several plants from each plot are harvested and their ability to fix nitrogen determined. At the end of the test the plants are evaluated with regard to color, size and yield. The plants grown in soil treated with the above formulation are found to have a greater capacity to fix nitrogen and are greener than those in the untreated plots. Although there is little difference in plant size, there is a yield advantage for plants grown in treated soil. At the highest treating rate, this yield increase is about 20% (based on the untreated control).

I claim:

1. The method of preventing injury due to fungi comprising applying to the locus to be protected a fungicidally effective amount of a compound of the formula:

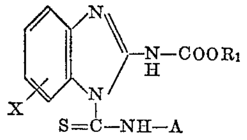

wherein $R_1$ is methyl, ethyl, isopropyl or sec-butyl;

X is hydrogen, chlorine, bromine, methyl, methoxy or nitro;

A is $$-\overset{O}{\overset{\|}{C}}-YR_2,\quad -\overset{O}{\overset{\|}{C}}-R_3 \text{ or } -\underset{\underset{O}{\downarrow}}{\overset{\overset{O}{\uparrow}}{S}}-R_4$$

$R_2$ is alkyl of 1 through 12 carbon atoms, cyclohexyl, phenyl, benzyl, allyl or propargyl;

$R_3$ is alkyl of 1 through 12 carbon atoms, cyclohexyl, phenyl, or benzyl;

$R_4$ is alkyl of 1 through 12 carbon atoms, alkyl of 1 through 12 carbon atoms substituted with 1 through 5 chlorine atoms, or

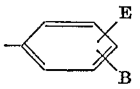

where

B is methyl, methoxy, bromine, chlorine, nitro or hydrogen and E is hydrogen or chlorine, provided that E is hydrogen when B is neither hydrogen nor chlorine;

Y is oxygen or sulfur.

2. The method of claim 1 wherein X is hydrogen, $R_1$ is methyl and A is $$-\overset{O}{\overset{\|}{C}}-Y-R_2$$

3. The method of claim 1 where the compound is methyl 1-[(methoxycarbonyl)thiocarbamoyl] - 2 - benzimidazolecarbamate.

4. The method of preventing injury due to mites comprising applying to the locus to be protected a mite ovicidally effective amount of a compound of the formula:

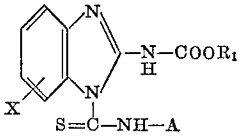

wherein $R_1$ is methyl, ethyl, isopropyl or sec-butyl;

X is hydrogen, chlorine, bromine, methyl, methoxy or nitro;

A is $$-\overset{O}{\overset{\|}{C}}-YR_2,\quad -\overset{O}{\overset{\|}{C}}-R_3 \text{ or } -\underset{\underset{O}{\downarrow}}{\overset{\overset{O}{\uparrow}}{S}}-R_3$$

$R_2$ is alkyl of 1 through 12 carbon atoms, cyclohexyl, phenyl, benzyl, allyl or propargyl;

$R_3$ is alkyl of 1 through 12 carbon atoms, cyclohexyl, phenyl, or benzyl;

$R_4$ is alkyl of 1 through 12 carbon atoms, alkyl of 1 through 12 carbon atoms substituted with 1 through 5 chlorine atoms, or

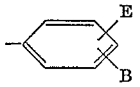

where

B is methyl, methoxy, bromine, chlorine, nitro or hydrogen and E is hydrogen or chlorine, provided that E is hydrogen when B is neither hydrogen nor chlorine;

Y is oxygen or sulfur.

5. A fungicidal composition comprising a fungicidally effective amount of a compound of the formula:

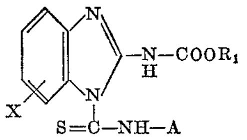

wherein $R_1$ is methyl, ethyl, isopropyl or sec-butyl;

X is hydrogen, chlorine, bromine, methyl, methoxy or nitro;

A is

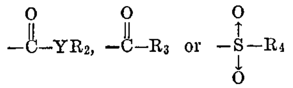

$R_2$ is alkyl of 1 through 12 carbon atoms, cyclohexyl, phenyl, benzyl, allyl or propargyl;

$R_3$ is alkyl of 1 through 12 carbon atoms, cyclohexyl, phenyl, or benzyl;

$R_4$ is alkyl of 1 through 12 carbon atoms, alkyl of 1 through 12 carbon atoms substituted with 1 through 5 chlorine atoms, or

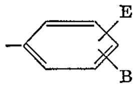

where

B is methyl, methoxy, bromine, chlorine, nitro or hydrogen and E is hydrogen or chlorine, provided that E is hydrogen when B is neither hydrogen nor chlorine;

Y is oxygen or sulfur;

with a fungicidal adjuvant.

6. The composition of claim 5 wherein X is hydrogen, $R_1$ is methyl or ethyl and A contains 1 through 7 carbon atoms.

7. The composition of claim 5 wherein X is hydrogen, $R_1$ is methyl and A is

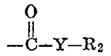

8. The composition of claim 5 wherein the compound is methyl 1-[(methoxycarbonyl)thiocarbamoyl]-2-benzimidazolecarbamate.

References Cited

UNITED STATES PATENTS

| | | | |
|---|---|---|---|
| 2,933,504 | 4/1960 | Klopping | 260—309.2 |
| 3,010,968 | 11/1961 | Loux | 260—309.2 |
| 3,454,700 | 7/1969 | Hyson | 424—273 |
| 3,472,866 | 10/1969 | Tattersall | 424—273 |

ALBERT T. MEYERS, Primary Examiner

V. D. TURNERS, Assistant Examiner

U.S. Cl. X.R.

106—15 AF; 117—138.5; 260—309.2